(12) United States Patent
Fujisawa et al.

(10) Patent No.: US 7,185,056 B2
(45) Date of Patent: Feb. 27, 2007

(54) APPARATUS AND METHOD FOR SHARING INFORMATION BETWEEN TERMINALS ON A NETWORK

(75) Inventors: Naoki Fujisawa, Tokyo (JP); Kiyonobu Kojima, Tokyo (JP); Yoshiyuki Takao, Kanagawa (JP)

(73) Assignee: Sony Corporation (JP)

(*) Notice: Subject to any disclaimer, the term of this patent is extended or adjusted under 35 U.S.C. 154(b) by 801 days.

(21) Appl. No.: 10/328,464

(22) Filed: Dec. 23, 2002

(65) Prior Publication Data

US 2003/0145056 A1 Jul. 31, 2003

(30) Foreign Application Priority Data

Dec. 25, 2001 (JP) ............................ P2001-391552

(51) Int. Cl.
*G06F 15/13* (2006.01)

(52) U.S. Cl. .................... 709/205; 709/217; 707/500; 715/751

(58) Field of Classification Search ................ 709/205, 709/217; 715/751; 707/500
See application file for complete search history.

(56) References Cited

U.S. PATENT DOCUMENTS

| | | | |
|---|---|---|---|
| 5,392,400 A | | 2/1995 | Berkowitz et al. |
| 5,664,103 A | * | 9/1997 | Stein et al. .................. 709/205 |
| 6,334,141 B1 | * | 12/2001 | Varma et al. ................ 709/205 |
| 6,342,906 B1 | * | 1/2002 | Kumar et al. ................ 715/751 |
| 6,360,250 B1 | * | 3/2002 | Anupam et al. ............ 709/204 |
| 6,748,425 B1 | * | 6/2004 | Duffy et al. ................. 709/217 |
| 2002/0049786 A1 | * | 4/2002 | Bibliowicz et al. ......... 707/511 |
| 2002/0129106 A1 | * | 9/2002 | Gutfreund ................... 709/205 |
| 2003/0120690 A1 | * | 6/2003 | Schaeffer et al. ........... 707/500 |

FOREIGN PATENT DOCUMENTS

| | | |
|---|---|---|
| JP | 08-329012 | 12/1996 |
| JP | 09-218854 | 8/1997 |
| JP | 2001-014244 | 1/2001 |
| JP | 2001-273219 | 10/2001 |

OTHER PUBLICATIONS

Walther, M., "Primitives for Group Communications in Electronic Meeting Systems", School of Information Technology, Bond University, Bond, Australia, Feb. 1996, pp. 1-90, no date.
Gosling, J., et al., "The Java Language Environment. A White Paper", Sun Microsystems Computer Company, Mountain View, CA, Oct. 1995, pp. 1, 4-85, no date.
Kindberg, T., et al., "Sharing Objects Over the Internet: The Mushroom Approach", Nov. 18, 1996, pp. 67-71, Department of Computer Science, Queen Mary and Westfield College, University of London, London, UK.

* cited by examiner

*Primary Examiner*—Viet D. Vu
*Assistant Examiner*—Jinsong Hu
(74) *Attorney, Agent, or Firm*—Lerner, David, Littenberg, Krumholz & Mentlik, LLP

(57) ABSTRACT

A program for processing information in a selected terminal apparatus includes reproducing contents data as a browsing object for output by the selected terminal apparatus; enabling operations to be performed on the browsing object; transmitting and receiving information over a network between a plurality of terminal apparatuses reproducing and outputting the contents data, the plurality of terminal apparatuses including the selected terminal apparatus, each of the terminal apparatuses having the browsing object, the information including shared information which denotes an operation performed on the browsing object of one of the plurality of terminal apparatuses to obtain a result; and sharing the result of the operation between the browsing objects of a remainder of the terminal apparatuses, the sharing being based on the shared information.

11 Claims, 20 Drawing Sheets

F I G. 3
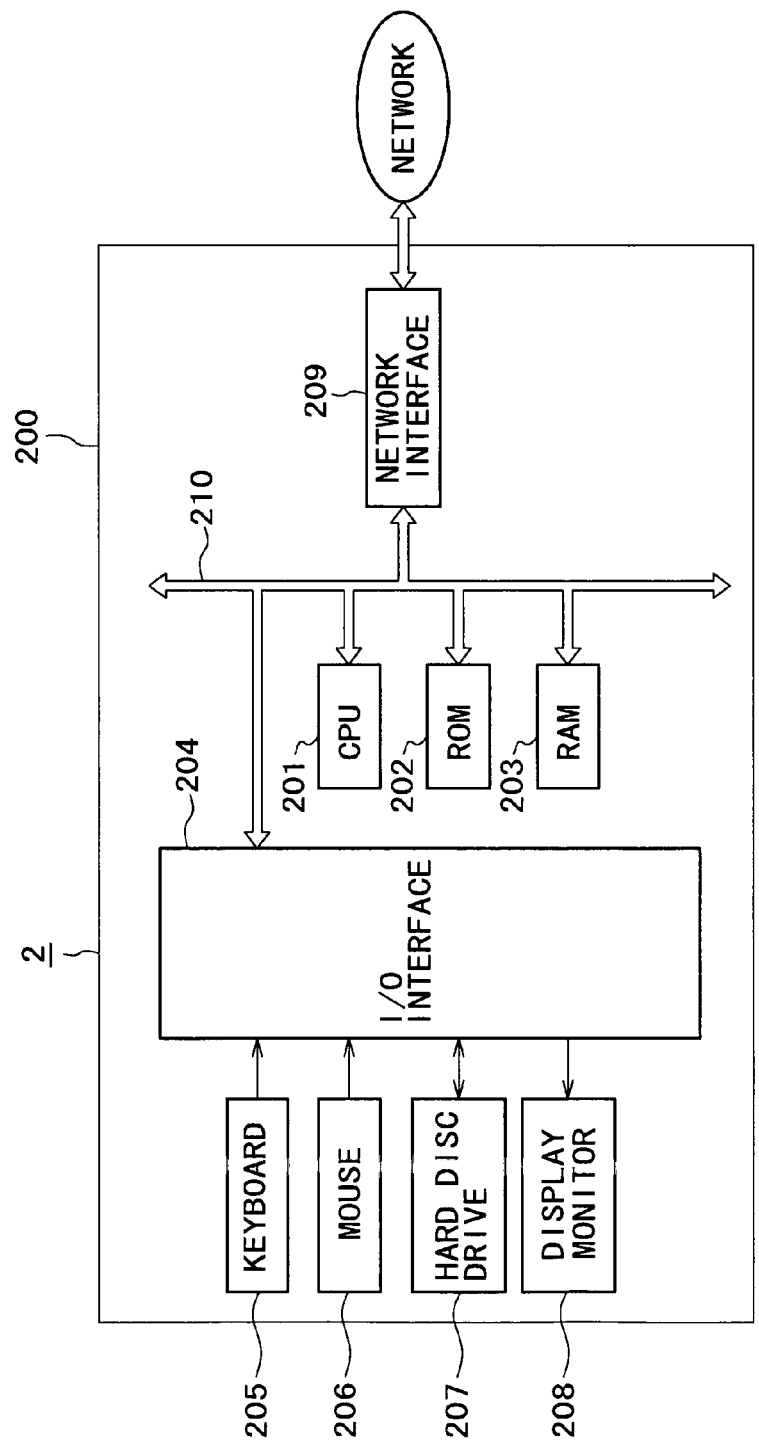

F I G. 4
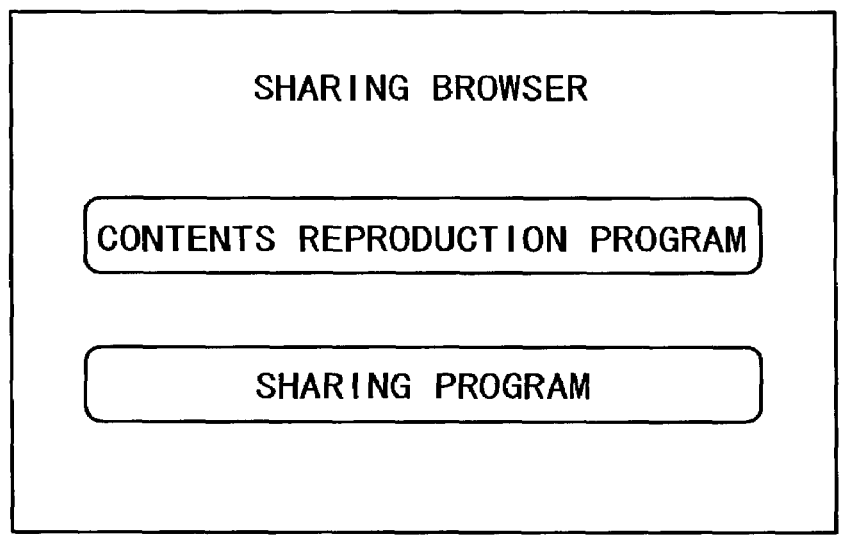

F I G. 7
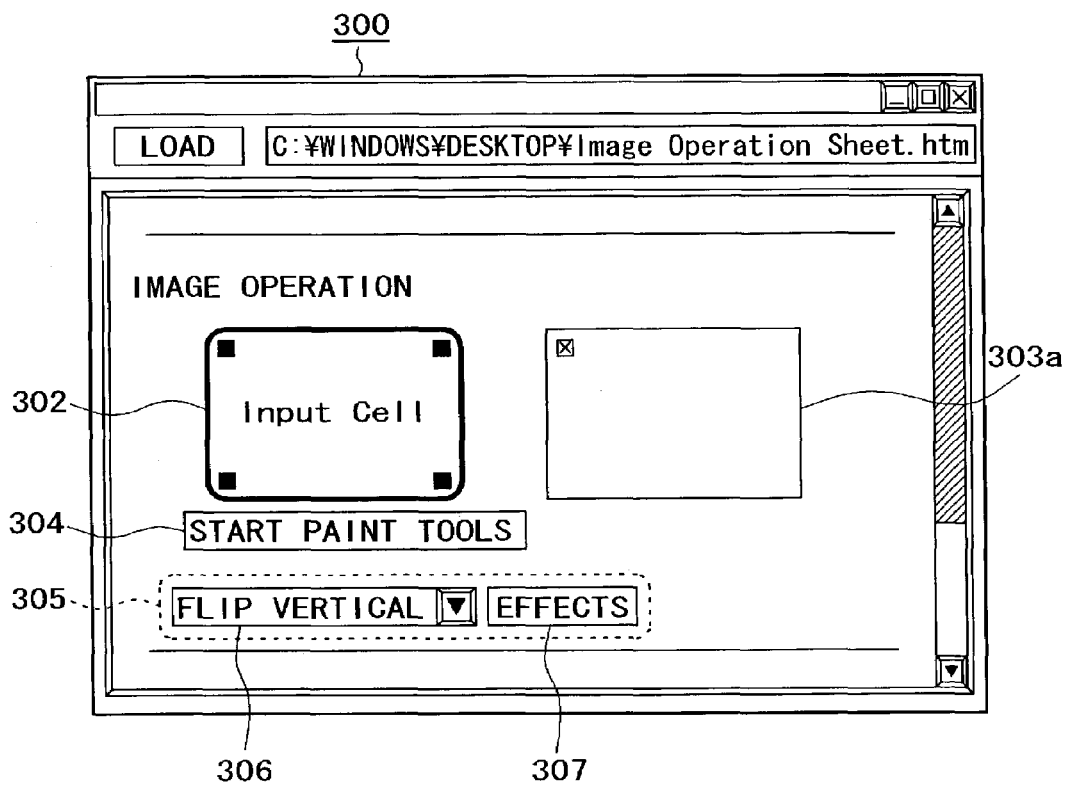

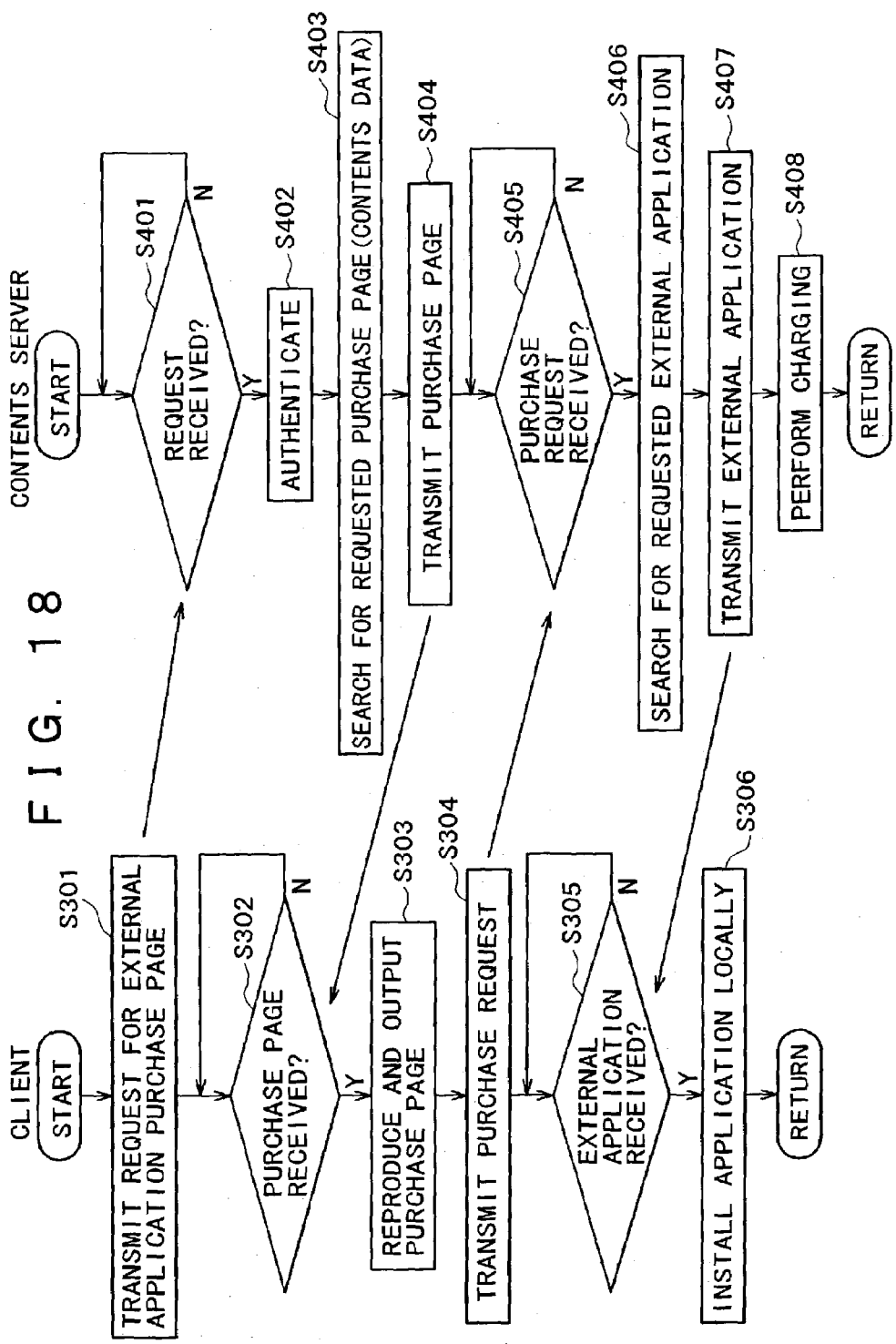

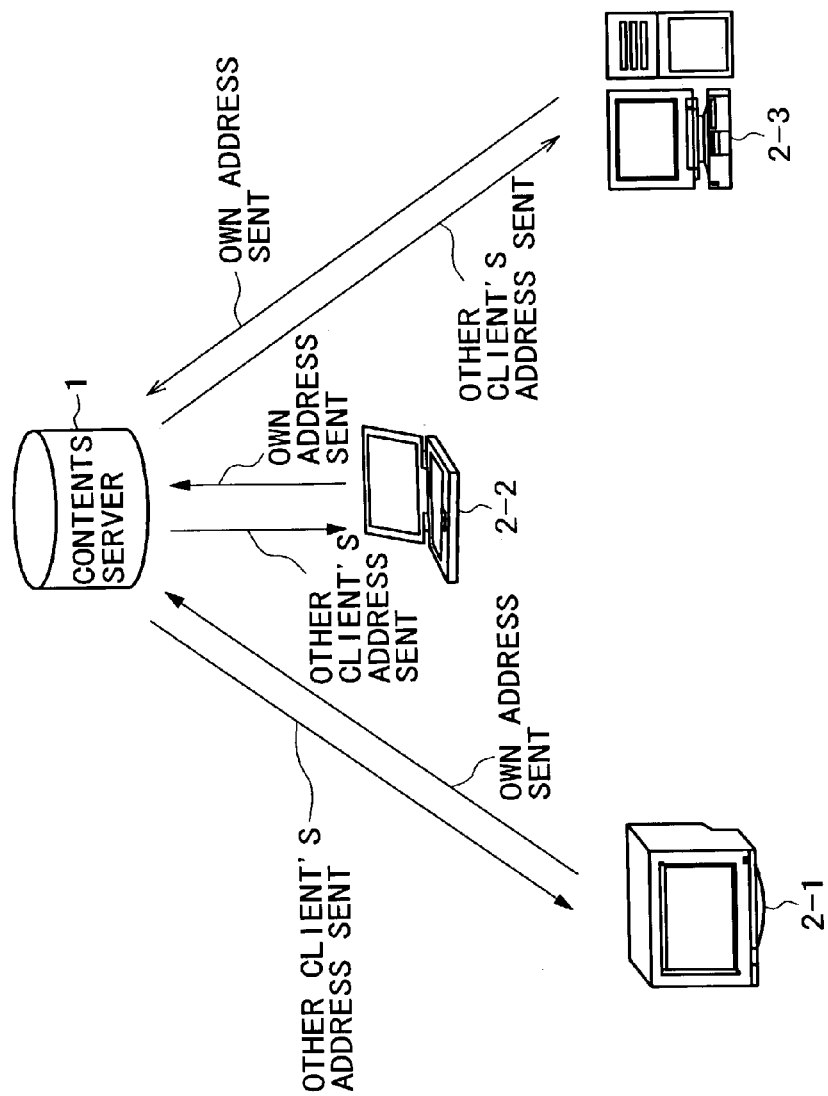

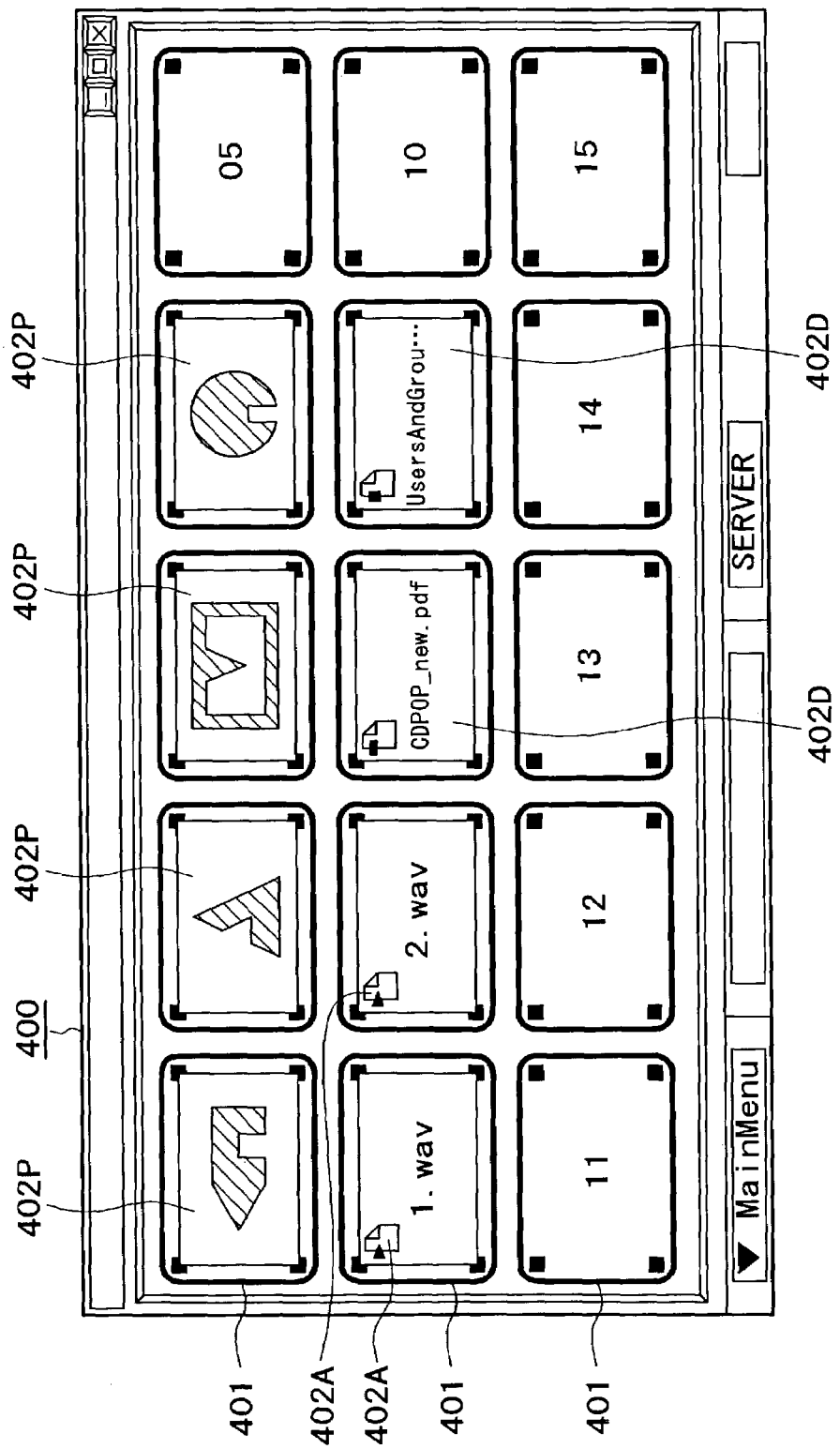

APPARATUS AND METHOD FOR SHARING INFORMATION BETWEEN TERMINALS ON A NETWORK

CROSS-REFERENCE TO RELATED APPLICATIONS

The present application claims priority from Japanese Application No. 2001-391552, the disclosure of which is hereby incorporated by reference herein.

BACKGROUND OF THE INVENTION

The present invention relates to an apparatus and method for sharing information between terminals on a network. More particularly, the invention relates to a program which allows, for example, a plurality of information processing apparatuses located on a network to reproduce and output contents data in a manner in which data and data-handling functions are shared therebetween; a network system including a plurality of terminal apparatuses making up such information processing apparatuses sharing the data and functions by use of the inventive program; and a terminal apparatus and a server apparatus constituting part of the inventive network system.

Terminal apparatuses which are interconnected by the Internet or via a LAN (local area network) and which retain files on their local hard discs are capable of sharing these files therebetween. Some application programs (file-sharing applications) today are known to offer more visually oriented GUI (graphical user interface) features for file-sharing operations than before.

FIG. 20 shows a typical application window display offered by such a file-sharing application program in a GUI format in a related art. The terminal apparatuses that are to share files therebetween over a network each have the file-sharing application program installed in advance. These terminal apparatuses are typically personal computers or PDAs (personal digital assistants) connected to the network.

Booting the file-sharing application program installed in any one of the networked terminal apparatuses causes an application window 400 to appear on the screen, which is one GUI feature of the program. In the application window 400, a plurality of file layout frames 401 are provided in the background as illustrated. This example shows an array of 15 file display frames 401 having frame numbers 01 through 15. A user at any one of the terminal apparatuses involved may drag-and-drop desired files (i.e., file icons) onto any of the file layout frames 401 in the application window 400.

The drag-and-dropped files have their icons displayed in the destination file layout frame 401 in superposed fashion. In FIG. 20, the file layout frames 401 with frame numbers 01 through 04 have still image data icons 402P displayed therein. Each of the icons 402P is shaped to suggest what is contained in the corresponding file. The file layout frames 401 with frame numbers 06 and 07 display audio data file icons; the file layout frames 401 with frame numbers 08 and 09 show icons of document files in different file formats.

After the files are laid out as described in the application window 400 by drag-and-drop operations, users at the multiple terminal apparatuses interconnected by the network may boot the same file-sharing application program. With the application window 400 displayed on each terminal apparatus, the files are shared, for example, as described below.

Suppose that the icon of a given file is placed within a given file layout frame 401 in the application window 400 on one of the plurality of terminal apparatuses (terminal apparatus A). In such a case, the icon of the same file appears within the same file layout frame 401 in the application window 400 on any of the other terminal apparatuses (terminal apparatus B).

Suppose also that a file is placed within the application window 400 on the terminal apparatus A so that the icon of that file is displayed anew in the application window 400 on the terminal apparatus B, and that the user at the terminal apparatus B has performed an operation to save the file in question. In that case, the terminal apparatus B acquires the file denoted by the icon from the terminal apparatus A over the network and saves the obtained file onto a local hard disc of the terminal apparatus B. This is how files are typically shared over the network.

One disadvantage of the related-art file-sharing application software is that it allows each of the networked terminal apparatuses to perform only limited operations on shared files, such as saving desired files into local storage. If an improved file-sharing application program offered more functions allowing the networked terminal apparatuses to share files in diverse processes including rendering and editing, the benefits to the users of the terminal apparatuses will be appreciably enhanced.

Preferably, such improved file-sharing applications should be furnished with file-processing functions not in a fixed fashion, but on a plug-in basis offering a high degree of flexibility as to the manner in which files are shared. This will provide a greater potential for expansion in terms of shared file processing.

SUMMARY OF THE INVENTION

It is therefore an object of the present invention to overcome the above and other deficiencies of the related art and to provide a program, a network system, a terminal apparatus, and a server apparatus improving significantly on their related-art counterparts.

In carrying out the invention and according to one aspect thereof, there is provided a recording medium recorded with a computer program for processing information on a selected terminal apparatus, the program including reproducing contents data as a browsing object for output by the selected terminal apparatus; enabling operations to be performed on the browsing object; transmitting and receiving information over a network between a plurality of terminal apparatuses reproducing and outputting the contents data, the plurality of terminal apparatuses including the selected terminal apparatus, each of the terminal apparatuses having the browsing object, the information including shared information which denotes an operation performed on the browsing object of one of the plurality of terminal apparatuses to obtain a result; and sharing the result of the operation between the browsing objects of a remainder of the terminal apparatuses, the sharing being based on the shared information.

According to another aspect of the invention, there is provided a network system including a plurality of terminal apparatuses interconnected via a network, each of the terminal apparatuses including reproducing means for reproducing and outputting contents data as a browsing object; enabling means for enabling operations to be performed on the browsing object; transmitting and receiving means for transmitting and receiving information over the network between the plurality of terminal apparatuses reproducing and outputting the contents data, the information including shared information which denotes an operation performed on the browsing object of one of the plurality of terminal apparatuses to obtain a result; and sharing means for sharing the result of the operation between the browsing objects of a remainder of the terminal apparatuses, the sharing being based on the shared information.

According to a further aspect of the invention, there is provided a terminal apparatus including connecting means for connecting to at least one other terminal apparatus via a network; reproducing means for reproducing and outputting contents data as a browsing object; enabling means for enabling operations to be performed on the browsing object; transmitting and receiving means for transmitting information over the network to and receiving information over the network from the at least one other terminal apparatus reproducing and outputting the contents data, the information including shared information which denotes an operation performed on the browsing object of one of the terminal apparatus and the at least one other terminal apparatus to obtain a result; and sharing means for sharing the result of the operation with the browsing object of the at least one terminal apparatus when the terminal apparatus performs the operation, the sharing being based on the shared information.

Where the inventive structures above are in use and where each of the terminal apparatuses connected by the network reproduces and outputs the same contents data as the browsing object, the result of any operation performed on the browsing object of any one apparatus appears in like manner on the browsing objects of the remaining apparatuses. According to the invention, the networked terminal apparatuses reproducing and outputting the same contents data as their browsing objects provide an environment in which an application program made up of contents data can be shared between the apparatuses. In that environment, the result of processing corresponding to diverse operations performed on the browsing object of any one apparatus appears likewise on the browsing objects of the remaining apparatuses. In other words, functions implemented by the operation of the application program can be shared by the interconnected apparatuses.

According to an even further aspect of the invention, there is provided a server connected to a plurality of terminal apparatuses via a network, the server including first storing means for storing contents data which are reproduced and output by each of the terminal apparatuses as a browsing object, the first storing means further allowing the result of an operation performed by one of the terminal apparatuses to be acquired on the browsing objects of a remainder of the terminal apparatuses which reproduce and output the contents data; first transmitting means for transmitting the contents data to a requesting one of the terminal apparatuses; second storing means for storing an external application program which is locally installed in each of the terminal apparatuses and which enables execution of a function corresponding to an operation performed on the browsing object; second transmitting means for transmitting the external application program to one of the terminal apparatuses as a result of a purchase request made through the operation on the browsing object of the one terminal apparatus; and charging control means for charging a user for the external application program transmitted to the one terminal apparatus.

With the inventive structure above in use, multiple terminal apparatuses may download the same contents data from the server to reproduce and output the downloaded data as their browsing objects, whereby functions of the contents data as part of a program may be shared between the terminal apparatuses. The contents data also allow predetermined functions to be executed using an external application program installed locally in each of the connected terminal apparatuses.

An operation can be performed on the browsing object made up of the contents data to purchase the external application program. Performing the purchasing operation causes the server to upload the external application program to the terminal apparatus performing the purchasing operation, and to charge the terminal user for the purchased program at the same time. That is, the user at any one of the terminal apparatuses connected to the server may purchase and download the external application program to be used with the contents data by performing all necessary operations on the browsing object made up of the contents data.

The present invention may be implemented, for example, by use of a remote control system, electronic equipment, and an information processing method following the steps of the inventive program. The invention may also be implemented using a storage medium which stores the program according to the invention.

Other objects, features and advantages of the invention will become more apparent from the following description and the appended drawings.

BRIEF DESCRIPTION OF THE DRAWINGS

FIG. 3 is a block diagram illustrating a typical structure of a personal computer working as a client;

FIG. 4 is an explanatory view conceptually indicating the program structure of a sharing browser;

FIG. 7 is another explanatory view showing cells displayed in the browser window;

FIG. 18 is a flowchart of steps performed by a client and a server when an external application program is purchased through the first variation (screen display) and installed into the client;

FIG. 19 is an explanatory view depicting a typical structure of another network system (second variation) embodying the invention; and FIG. 20 is an explanatory view showing a typical application window display associated with a file-sharing application program in a related art.

DETAILED DESCRIPTION

Figure 1:
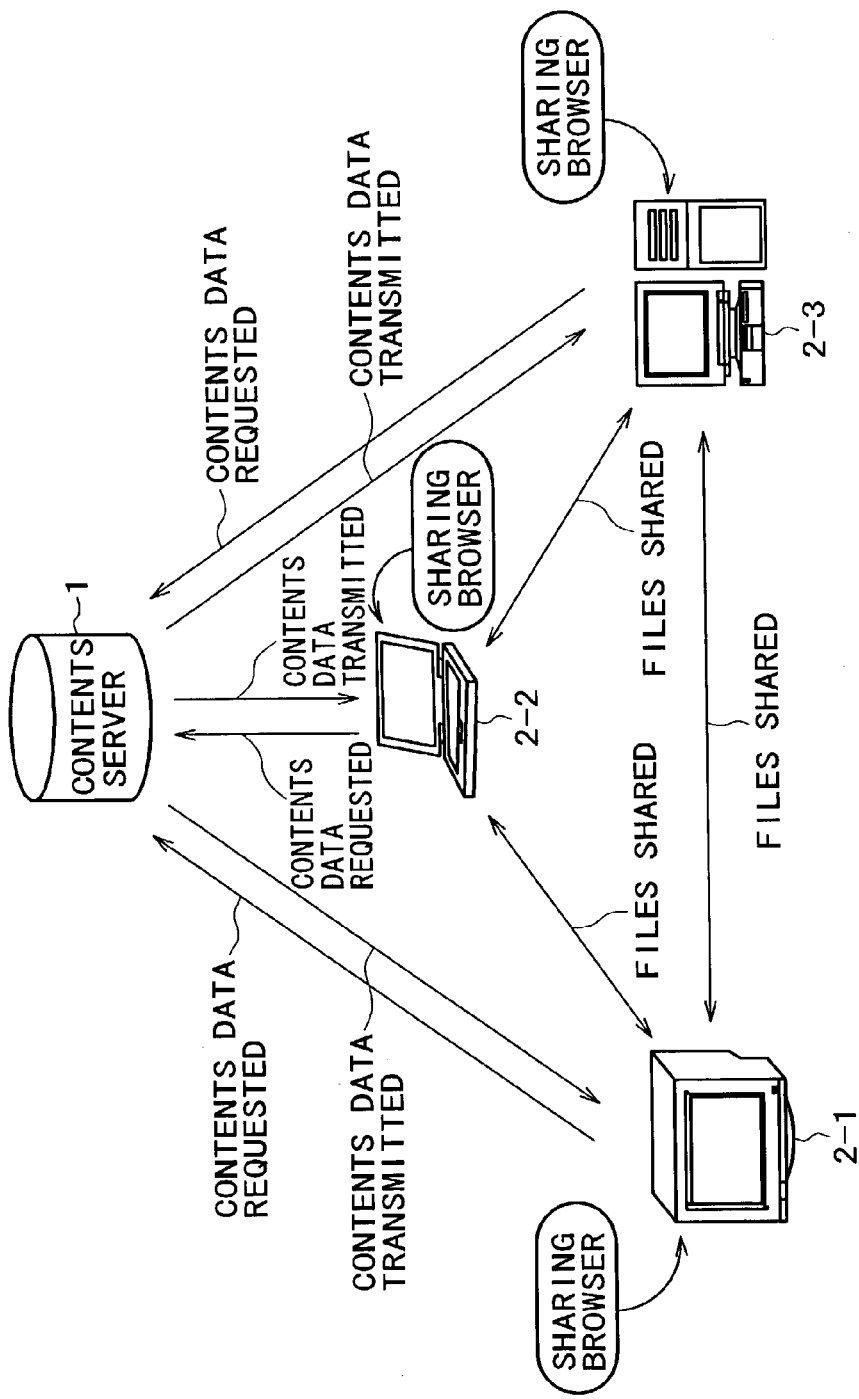
FIG. 1 is a schematic view showing a typical structure of a network system embodying the invention.

Preferred embodiments of this invention will now be described with reference to the accompanying drawings under the following headings:
1. System configuration
2. Contents server
3. Clients (personal computers)
4. Program structure of the sharing browser
5. Contents data
   5-1. Concept of the contents data structure
   5-2. Examples of file processing involving contents data
      5-2-1. First example (image processing: background processing)
      5-2-2. Second example (image processing: external application program boot-up)
      5-2-3. Third example (file processing: image composition processing)
      5-2-4. Fourth example (file processing: moving image processing)
      5-2-5. Fifth example (picked-up image file loading)
      5-2-6. Sixth example (file processing: text-to-speech reading)
6. Processing examples
7. First variation: system configuration in effect when external application programs are arranged to be purchased
8. Second variation: system configuration in effect when client addresses are managed by a server 1. System Configuration FIG. 1 schematically shows a typical structure of a network system embodying the invention. As illustrated, the network system of this embodiment consists of a contents server 1 and a plurality of clients 2 connected with the server 1 over a network. The setup of FIG. 1 involves three clients 2-1, 2-2 and 2-3.

The network for building up the network system of this embodiment is, for example, composed of the Internet. However, the invention is not limited to such network. A LAN (local area network), a WAN (wide area network) or the like for use over limited areas may also be used as the network for the invention.

In this embodiment of the invention, the clients 2 may be interconnected via a LAN, with the contents server 1 alone connected to the Internet. Alternatively, the clients 2 may be connected to the contents server 1 via the Internet. In the description that follows, the contents server 1 and its clients 2 are assumed to be connected via the Internet for purpose of simplification and illustration.

With this embodiment, each client 2 has a sharing browser installed therein as application software. The sharing browser is capable of reproducing and displaying contents data which are downloaded from the contents server 1 and which have been prepared in a suitable format such as HTML or XML.

Where the clients reproducing and displaying the same contents data are interconnected via the network, application functions associated with the contents data can be shared by the clients. More specifically, as will be discussed later in detail, the embodiment permits sharing by clients of files and the operations for executing necessary processes (i.e., functions) such as editing. In other words, it is possible to share not only the files, but also diverse functions such as those for processing the files.

The diverse functions to be shared are implemented by the sharing browser reproducing contents data which include executable scripts or like elements executed in conjunction with an external application program. When the contents data are reproduced for output as the browser screen being displayed, appropriate operations carried out on the screen execute the scripts for controlling the external application program. That is, suitably operating on the browser screen allows the screen to acquire the functions supported by the external application program. Where the same contents data are reproduced and output as the browser screens on the interconnected clients, these screens display the same function operation buttons, keys, etc. These buttons, keys and the like may be operated in order to share the corresponding functions between the clients. The contents server 1 is arranged to upload the contents data to the clients 2.

The contents server 1 retains diverse contents data describing the scripts for implementing various functions, as well as application programs such as Java. Each of the clients 2 is allowed to access the contents server 1 to request acquisition of necessary contents data. Specifically, a client 2 may designate an appropriate address upon access to the contents server 1. For example, since this embodiment utilizes the Internet as its network, the client may specify a URL (uniform resource locator) for access purposes.

In response to the client's request, the contents server 1 returns the requested contents data from its storage to the requesting client 2. Upon receipt of the contents data from the contents server 1, the client 2 gets the sharing browser to reproduce and output the received contents data. This allows the client 2 in question to display a browser screen equipped with particular functions.

Typically, where a plurality of clients 2 gain access to the contents server 1 as described above, the clients accessing the same address are in an interconnected state over the network. In that case, the interconnected clients reproducing and outputting the same contents data can share files and functions including those for processing the files using the browser screens of the sharing browser. Specific examples of files and functions shared in this embodiment will be described later.

2. Contents Server

Figure 2:
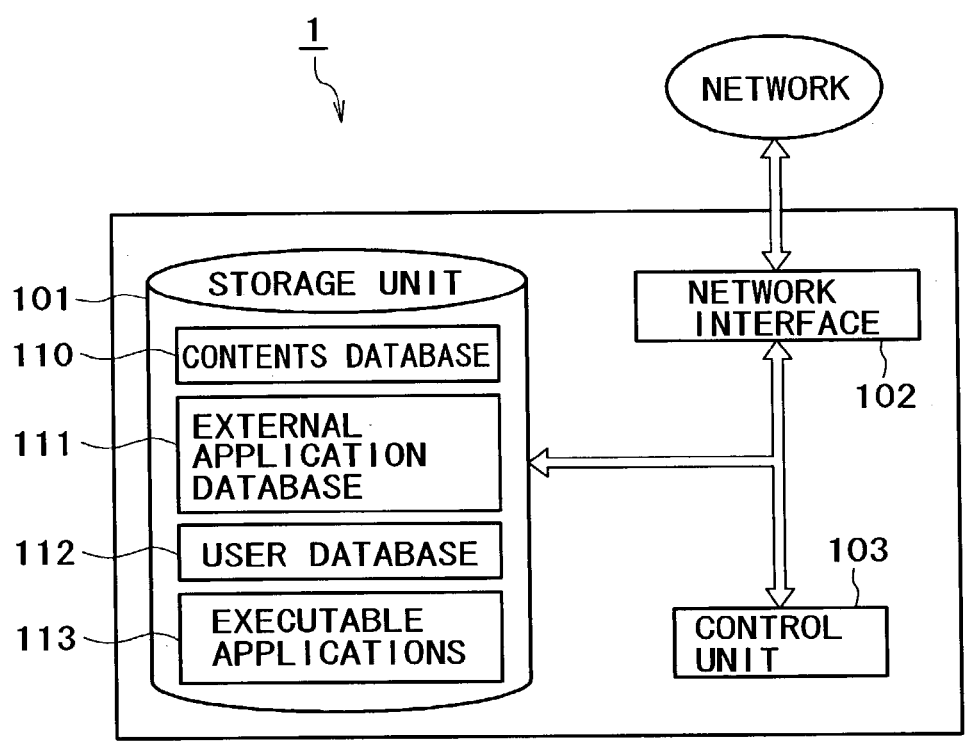
FIG. 2 is a block diagram depicting a typical internal structure of a contents server.

FIG. 2 is a block diagram depicting a typical internal structure of the contents server 1. As shown in FIG. 2, the contents server 1 comprises, for example, a storage unit 101, a network interface 102, and a control unit 103.

The storage unit 101 stores various types of data needed to implement the functions of the contents server. Typically, the storage unit 101 contains a contents database 110, an external application database 111, a user database 112, and executable applications 113.

The contents database 110 accommodates contents data to be uploaded to the clients 2. The external application database 111 retains various programs as necessary external applications in database form. With this embodiment, the contents data uploaded from the contents server 1 to a given client 2 are used in conjunction with a suitable external application program installed locally in the client in question, whereby relevant functions are obtained. The external application programs to be installed in the clients 2 are held in the external application database 111.

The user database 112 is used to manage users of the clients 2. As such, the user database 112 contains user IDs and other necessary data about the client users in database form. The data in the user database 112 are utilized, for example, to authenticate each client 2 requesting a function program from the contents server 1 upon access thereto.

The executable applications 113 are a set of diverse application programs associated with diverse operations to be carried out by the contents server 1. Typically, the executable applications 113 include an application program for supervising data transmission to and reception from the clients 2 over the network, an application program for searching through the contents database 110 and external application database 111, and an application program for carrying out user authentication in accordance with the user database 112.

The network interface 102 supervises interfacing functions for connection to each of the clients 2 over the network. The control unit 103 carries out various control processes in keeping with program elements taken from any one of the executable applications 113.

3. Clients (Personal Computers)

Described below with reference to FIG. 3 is a typical structure of a personal computer 200 acting as the client 2. As illustrated, the personal computer 200 in FIG. 3 includes a network interface 209 for communication over the network. With the network interface 209 in operation, the personal computer 200 can connect to other clients 2 via the network and can gain access to the contents server 1.

In a typical LAN setup, the network interface 209 is structured so as to comply with LAN-compatible communication protocols. In an Internet environment, the network interface 209 is structured to comply, for example, with TCP/IP.

A CPU 201 carries out various processes, for example, in accordance with diverse application programs installed on a hard disc drive 207 or with program elements held in a ROM 202. With this embodiment, the application program constituting the sharing browser is installed on the hard disc drive 207. When the CPU 201 performs processing in keeping with the application program constituting the sharing browser and when the sharing browser reproduces and outputs contents data, it is possible for the client in question to share files as well as file-sharing operations with other clients. A RAM 203 retains data and programs needed for the CPU 201 to carry out diverse processes.

An I/O interface 204 is connected to a keyboard 205 and a mouse 206. Operation signals coming from the keyboard 205 and mouse 206 are forwarded through the I/O interface 204 to the CPU 201. The I/O interface 204 is also connected to the hard disc drive 207 furnished with a hard disc as a storage medium. The CPU 201 writes data or programs to the hard disc in the hard disc drive 207 and reads data or programs from the hard disc in the hard disc drive 207 through the I/O interface 204. In this personal computer, the I/O interface 204 is connected further with a display monitor 208 for image display purposes.

An internal bus 210 consists, for example, of a PCI (Peripheral Component Interconnect) bus or a local bus. The bus 210 is arranged to interconnect functional circuits within the PC.

4. Program Structure of the Sharing Browser

What follows is a description of the sharing browser that operates when installed in each client 2. FIG. 4 indicates conceptually a typical program structure of the sharing browser. As illustrated, the sharing browser of this embodiment includes a contents reproduction program and a sharing program as the main program elements.

The contents reproduction program serves to acquire from the contents server 1 requested contents data whose address has been designated. The contents reproduction program also reproduces and outputs the acquired contents data in a manner which is, for example, suitable for display in the browser window.

The sharing program serves to permit sharing of files and functions on the browser screen with at least one other client 2 which currently exists on the network and which reproduces and outputs the contents data having the same address through access to the contents server 1. The sharing program allows each client 2 to communicate with other sharing clients 2 which are connected via the network. In this setup, if any one of multiple sharing clients has any operation carried out on its browser screen, the information corresponding to that operation (dragged position information, operated button information, resulting process information, etc.) is transmitted to the other clients 2. That is, with any one client operated on, the information corresponding to the operation is reflected on the browser screens of all other clients 2 involved. This allows files and functions to be shared between the clients, as will be discussed later in more detail.

5. Contents Data 5-1. Concept of the Contents Data Structure

The contents data to be reproduced and output by the sharing browser are described below. A typical structure of the contents data will be discussed first.

The contents data for use with this embodiment of the invention are multimedia contents (programs) formed in compliance with such standards as HTML or XML. If certain contents data are given, for example, as an HTML file, then the data include, as is well known, an HTML document and executable scripts. The HTML document is formed by text and various tags that define layout information and other specifics. The executable scripts are designed to operate external application programs, as will be described later. More specifically, the scripts may be applets which are described in JavaScript or VBScript and which can be executed, for example, on a web browser.

Figure 5A:
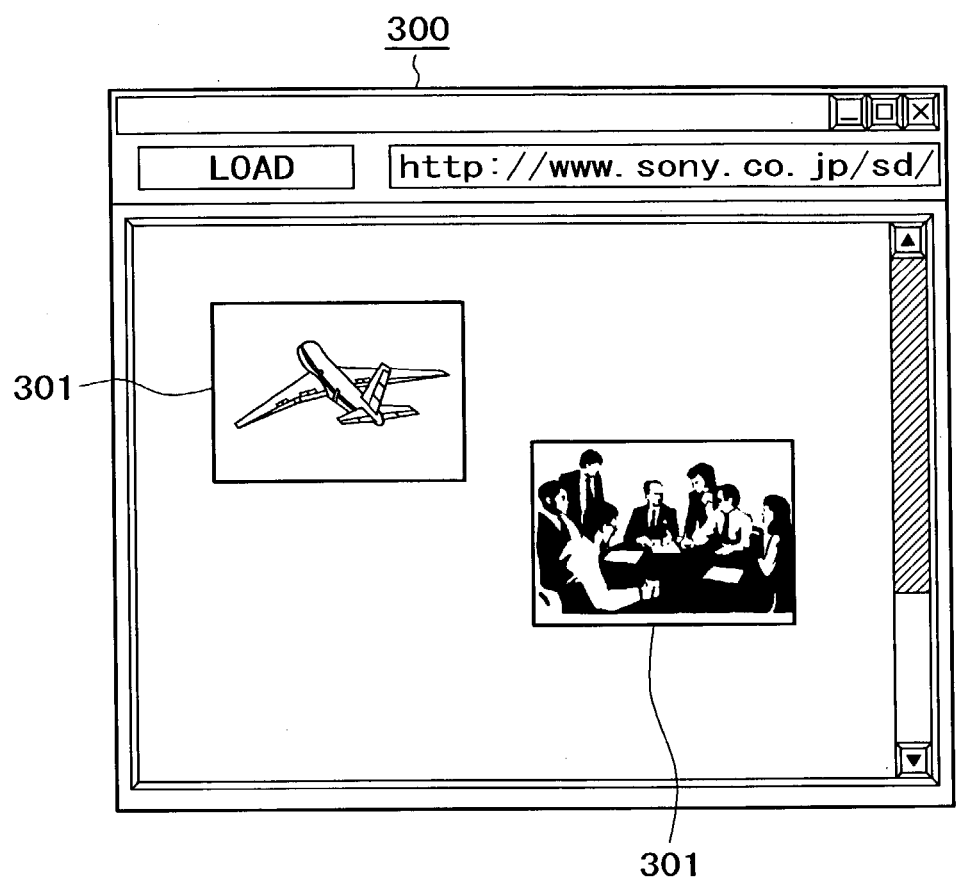
FIGS. 5A and 5B are explanatory views presenting the basic display constitution of a browser window.

FIG. 5A shows a browser window 300 of the sharing browser. When an operation is carried out on a client 2 to boot the sharing browser, the personal computer implementing the client 2 loads the sharing browser program from, say, the hard disc drive 207 into the RAM 203 for boot-up. When an address (URL) is designated, the client 2 reads the corresponding contents from the contents server 1 and reproduces the retrieved contents data to display the browser window 300 of FIG. 5A on the display monitor 208.

Figure 5B:
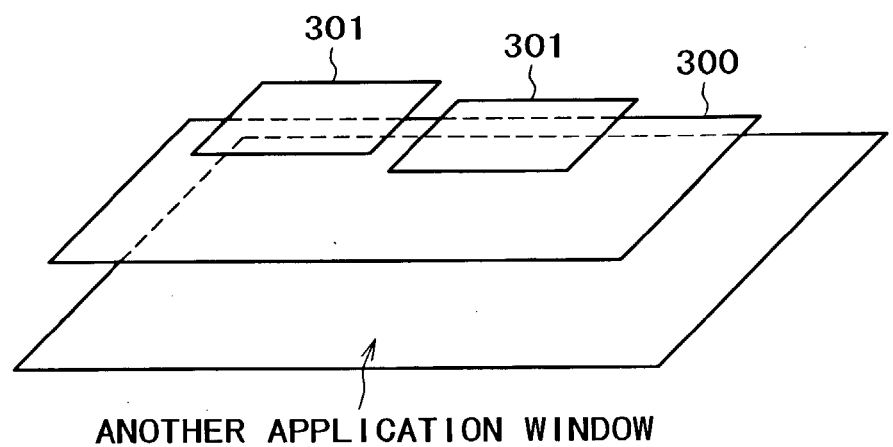

The browser window 300 is what is generally known as an application window. If another application window is currently opened and displayed, the browser window 300 can be displayed in superposed relation to the existing application window as shown in FIG. 5B. FIG. 5B depicts conceptually how the application windows are displayed in superposed relation to shared file thumbnails 301, to be discussed below.

As shown in FIGS. 5A and 5B, the browser window 300 appearing on the screen permits display of shared file thumbnails 301, icons that are representative of shared files. Multiple shared file thumbnails can be displayed as needed. Adding or removing shared files increases or reduces the number of shared file thumbnails 301 correspondingly. Any shared file thumbnail 301 may be changed in position when dragged by the user.

When an operation is performed on a client 2 to change the number of shared file thumbnails 301 or the position of any of them using the sharing program in the sharing browser, the information associated with the operation is communicated among the clients 2 involved. As a result, all interconnected clients share the display status of the same shared file thumbnails.

Figure 6:
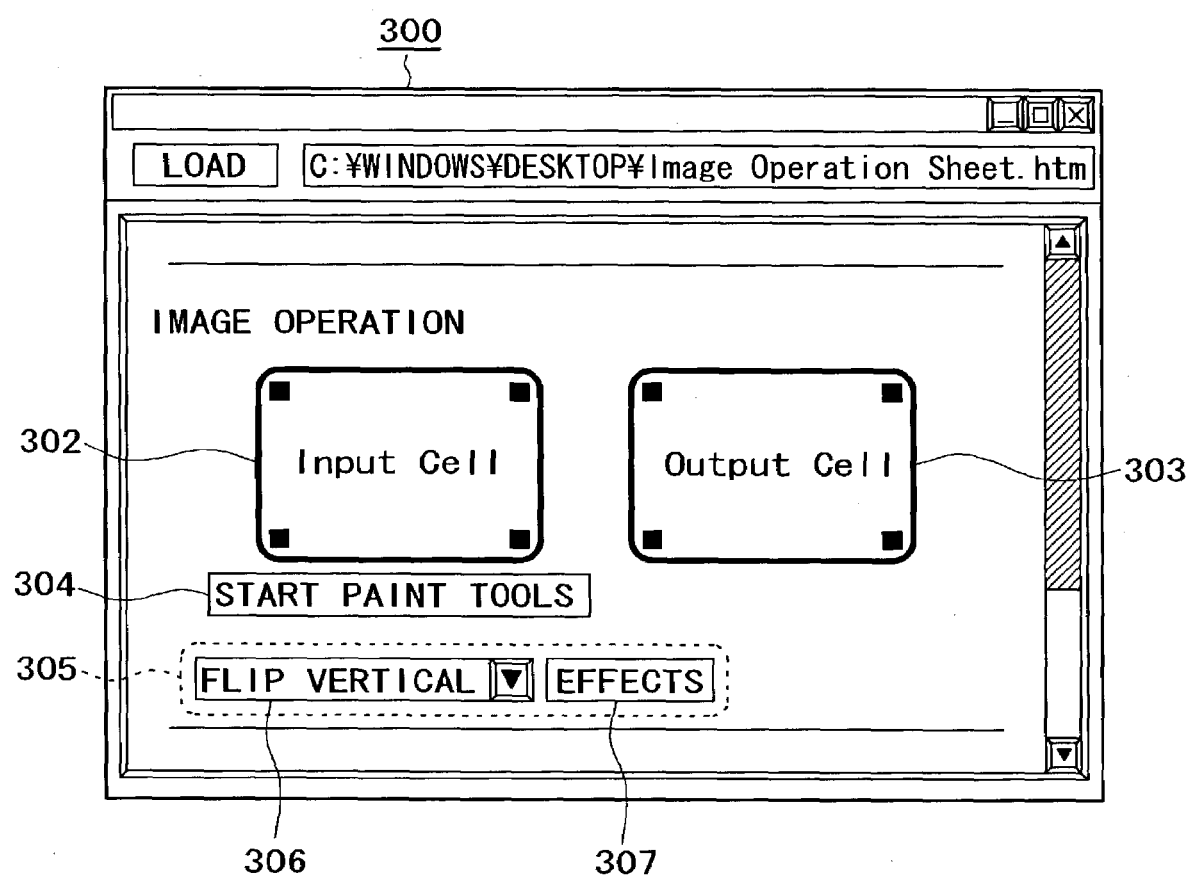
FIG. 6 is an explanatory view showing cells displayed in the browser window.

FIG. 6 shows basically how cells are displayed in the browser window 300. With this embodiment, contents data are structured in a manner enabling file processing functions, for example, in conjunction with external application programs. The file processing functions are implemented using an input cell 302 and an output cell 303 laid out in the window as shown in FIG. 6.

The window also includes a start button 304 and a function operation area 305. The start button 304 is used to enable operations on a shared file placed onto the input cell 302. The function operation area 305 is shown as including a pull-down menu 306 and an execution button 307. The input cell 302, output cell 303, start button 304, and function operation area 305 are displayed in the browser window 300 in sizes and positions defined by the contents data.

In the browser window 300, the input cell 302 forms a display frame into which to place a shared file to be processed by a function program. The user of a client 2 drag-and-drops onto the input cell 302 the shared file thumbnail 301 of any shared file desired to be processed.

Where the shared file thumbnail 301 is placed onto the input cell 302, that means the file represented by the thumbnail 301 has now been entered as a shared file to be processed. With this embodiment, such files are also called input files. A substance file (i.e., input file) corresponding to the shared file thumbnail 301 thus input is shared among the clients 2. Through their communication, any one client 2 may thus acquire from another client 2 any input file held locally in the latter.

Unlike the input cell 302, the output cell 303 does not accept input of a shared file; the cell 303 indicates a modified file. For example, after the shared file placed onto the input cell 302 has been processed, the altered shared file resulting from the process is stored locally on the hard disc of a client 2. The output cell 303 displays the shared file thus processed in the form of a shared file thumbnail 301.

The start button 304 shown in FIG. 6 is used to let an operation performed in the browser window 300 boot up an external application program for file processing. For example, clicking on the start button 304 indicated as "Start Paint Tools" in FIG. 6 activates a paint tool application program installed locally apart from the sharing browser.

The function operation area 305 positioned in the browser window 300 permits operation of the external application. Specifically, menus and buttons displayed within the function operation area 305 are manipulated to operate the external application in the background so as to process the shared file in the input cell 302 as desired. The function operation area 305 in FIG. 6 is an area for carrying out simple editing processes on image data. In this example, the area 305 has a pull-down menu 306 and the execution button 307 laid out as illustrated.

This embodiment also has a function cell, not shown. As with the input cell 302 and output cell 303, the function cell is located within the browser window 300 by use of a function program. The function cell implements diverse functions when carried out as an application program.

For example, one of the functions of the function cell may involve inputting an input file to the input cell. Another function may involve bringing a shared file thumbnail that was input to another input cell into the function cell for more file processing. A further function may involve outputting a shared file that was processed to the output cell. Yet another function may involve taking a shared file from within one output cell and outputting the file to another output cell. That is, the functionality of the embodiment can be expanded in diverse ways for further file processing by adding the function cell.

The substance of the cells (input cell 302, output cell 303) is application software residing locally on each client 2. How the cells are to be used is designated by contents data. To have the cells function properly requires that the application software designated by contents data be installed as so-called external applications of this embodiment in local storage, such as the hard disc drive of each client 2.

It might happen that when the sharing browser is to retrieve contents data and reproduce the retrieved data for output, an application program locally required for the reproduction and output does not exist. In such a case, a cell function corresponding to that function program cannot be utilized. Then the cell corresponding to the function does not appear in the browser window 300. The absence of the function is represented by a non-display area 303a in FIG. 7. The area 303a indicates that the necessary external application does not locally exist.

The displays of the browser window 300 shown in FIGS. 5A through 7 are only examples and may vary depending on the file processing functions to be implemented using contents data. The format of the contents data is not limited to HTML or XML mentioned earlier; the data may be furnished in a format complying with any other suitable multimedia contents standard.

5-2. Examples of File Processing Involving Contents Data 5-2-1. First Example (Image Processing: Background Processing)

This embodiment of the invention presents the browser window 300 by reproducing and outputting contents data, implements diverse functions in the window 300 reflecting the descriptive substance and executable scripts constituting the contents data, and allows the functions to be shared by the interconnected clients. A total of six functions thus implemented will be discussed below as six examples involving the contents data.

A first example function of this embodiment involves processing input files. The file processing is carried out generally in one of two ways: either an external application program is run in the background, or an external application program is booted and its application window opened to let the files be processed within the window. Described below is the case of an external application program being run in the background as the first example for file processing. For the purpose of the description, the file processing will be described below simply as that of rotating an image from an image file.

Figure 8A:
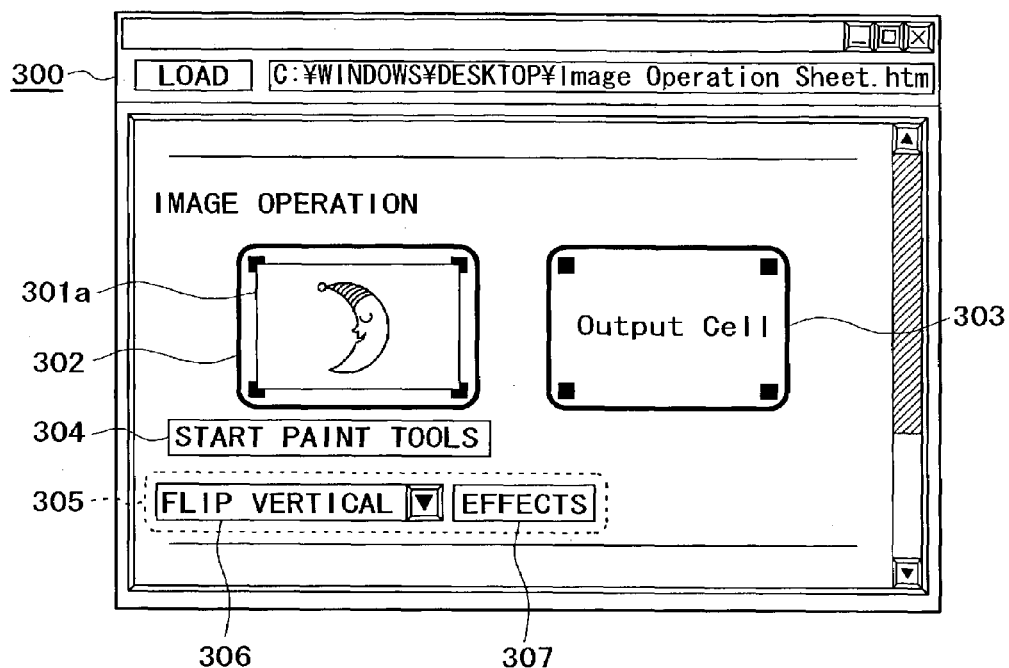
FIGS. 8A and 8B are explanatory views depicting a typical function (first example) implemented in the browser window.
Figure 8B:
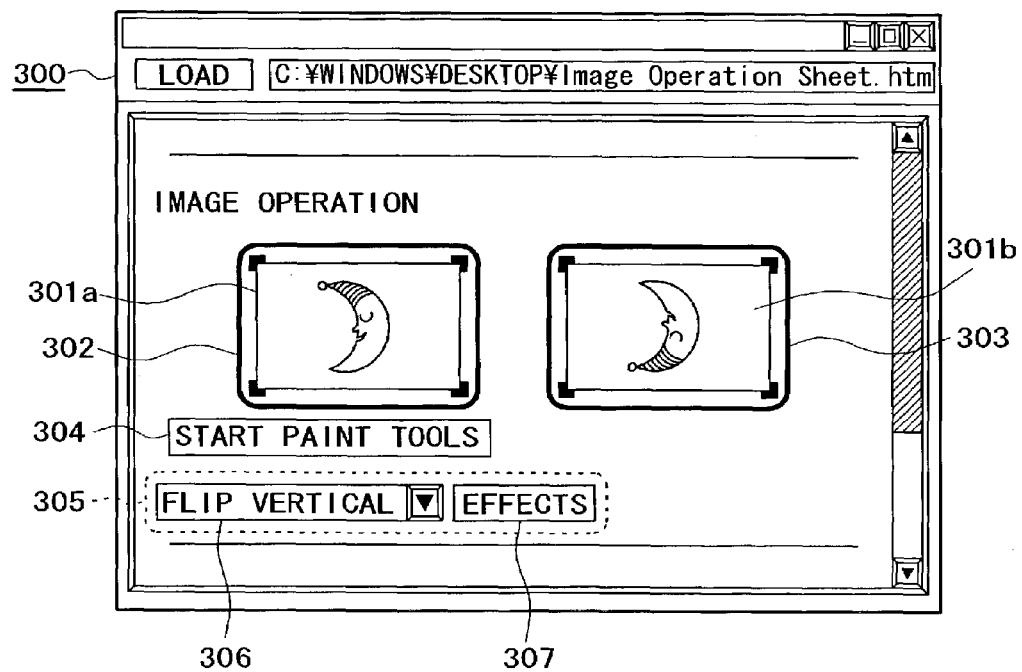

FIGS. 8A and 8B show a typical browser window 300 obtained by reproducing the contents data for the first example. The background of the browser window 300 in FIGS. 8A and 8B is the same as that in FIG. 6. For this example, it is assumed that the file represented by a shared thumbnail image 301a in the input cell 302 is shared by a plurality of clients 2. The shared file is an image data file in a suitable format. As described above, this is an input file that has been drag-and-dropped onto the input cell 302 on one client 2 as the target file to be processed.

Suppose now that the user at one of the multiple clients 2 wants to rotate the image in the shared file. In such a case, the user first operates the pull-down menu 306 in the function operation area 305 to select the type of image processing, and then operates the execution button 307 indicated as "Effects." It is assumed here that "Flip Vertical" is selected by operation of the pull-down menu 306, followed by operation of the execution button 307.

The user's operations boot the external application program for image processing which is installed locally in the client 2 in question. Once booted, the external application program carries out flip-vertical processing on the image data entered in the input cell 302.

When the flip-vertical processing is completed, a shared file thumbnail denoting the resulting image data (shared file) is displayed in the output cell 303 as shown in FIG. 8B. As illustrated, the image of the shared file thumbnail 301b in the output cell 303 is a vertically-flipped mirror image of the shared thumbnail image 301a in the input cell 302. The newly created or altered image file resulting from the flip-vertical processing is stored locally in the client 2 on which the operations have been carried out.

The shared file thumbnail 301b in the output cell 303 following the image processing is also displayed in the output cell 303 on each of the other clients 2 involved. At this point, the sharing program works to transfer the output file appearing in the output cell 303 on the client 2 in question to the other clients so that the latter will have the transferred file stored locally as well. In other words, the image data file resulting from the image processing is shared by the interconnected clients 2.

For reasons of security, any client 2 other than that which has operated on the file preferably may require a specific operation to be carried out to store locally the file appearing in the output cell 303.

With this embodiment, the operations for processing files may also be shared by the clients. Since each client 2 reproduces and outputs the same contents data shown in FIGS. 8A and 8B, the start button 304 and function operation area 305 are also displayed in the browser window 300 of each client 2 as illustrated. When the button and area are manipulated in the manner described above on any one client 2, the resulting functions are shared by the other clients of this embodiment.

Suppose that after one client 2 has rotated an image, a second client 2 performs a further operation in the function operation area 305 for more image rotation. In that case, the external application program for image processing is booted locally from the second client 2 so as to rotate the image from a locally stored file. Following the subsequent image rotation, the image file is output to the output cell 303 and shared again by the clients 2.

With this embodiment, the actual image processing is carried out by the external application program installed locally in the client 2 that has been operated to process the image in question. In other words, those clients which have no such external application installed therein can only share input or output files. Such clients cannot share with any other client the functions for effecting image processing on the input files.

Given the above contents data structure, the contents data viewed by the sharing browser may be distributed and shared in unlimited fashion over the network. However, the functions, such as those for file processing, can be shared only if the relevant programs are installed locally. That restriction, combined, for example, with a user registration scheme, provides a secure file-sharing system that can be utilized only by authorized users. This restrictive aspect of the invention also applies to the other examples to be described below.

That an external application program is run "in the background" with this embodiment signifies that the application in question automatically effects necessary processing in response to such actions as manipulating the button or function operation area in the browser window 300. There is no need to boot and operate the external application program separately so as to operate on an application window provided by the activated application. Simply operating on the browser window 300 causes the relevant external application program to start up and perform necessary processing, all in the background.

In the explanation above, the image processing, such as handling of files, was described as executed by external application programs. Alternatively, the above-mentioned function cell may be suitably implemented to provide file processing and other functions. For example, the function cell may be displayed in the browser window 300 and arranged to act as an application program with its own functions. In that case, a function cell program is described in a manner specifying the operators to be displayed within the function cell, as well as the positions and sizes of these operators on display. At the same time, the function cell program is arranged to run and be controlled, for example, in keeping with VBScript, JavaScript, or any other suitable script language in the browser window 300.

What happens when the function cell is implemented with this embodiment is explained below by referring to FIGS. 8A and 8B. In this case, the function cell program enabling the function cell to operate on images causes the displays shown in FIGS. 8A and 8B to appear in the browser window 300. In this setup, the indications such as the input cell 302, output cell 303, start button 304, and function operation area 305 are displayed in accordance with the program and script descriptions constituting the function cell. These cells, buttons, and area functions are functionally executed in keeping with the program and script descriptions as well.

More specifically, if a user drag-and-drops an image data file onto the input cell 302, that file is processed as a target shared file according to the program and script descriptions making up the function cell. If an operation is further carried out on the function operation area 305, the process corresponding to that operation is performed not by an external application program in the background but by the relevant program or scripts of the function cell, before the result of the process is output to the output cell 303.

5-2-2. Second Example (Image Processing: External Application Program Boot-up)

A second example function of this embodiment involves booting an external application program and opening its application window for processing files. In this example, the file processing entails starting up a paint tool application program, an external application, for processing image files.

The paint tools constitute application software that affords paint effects on image data files.

Figure 9:
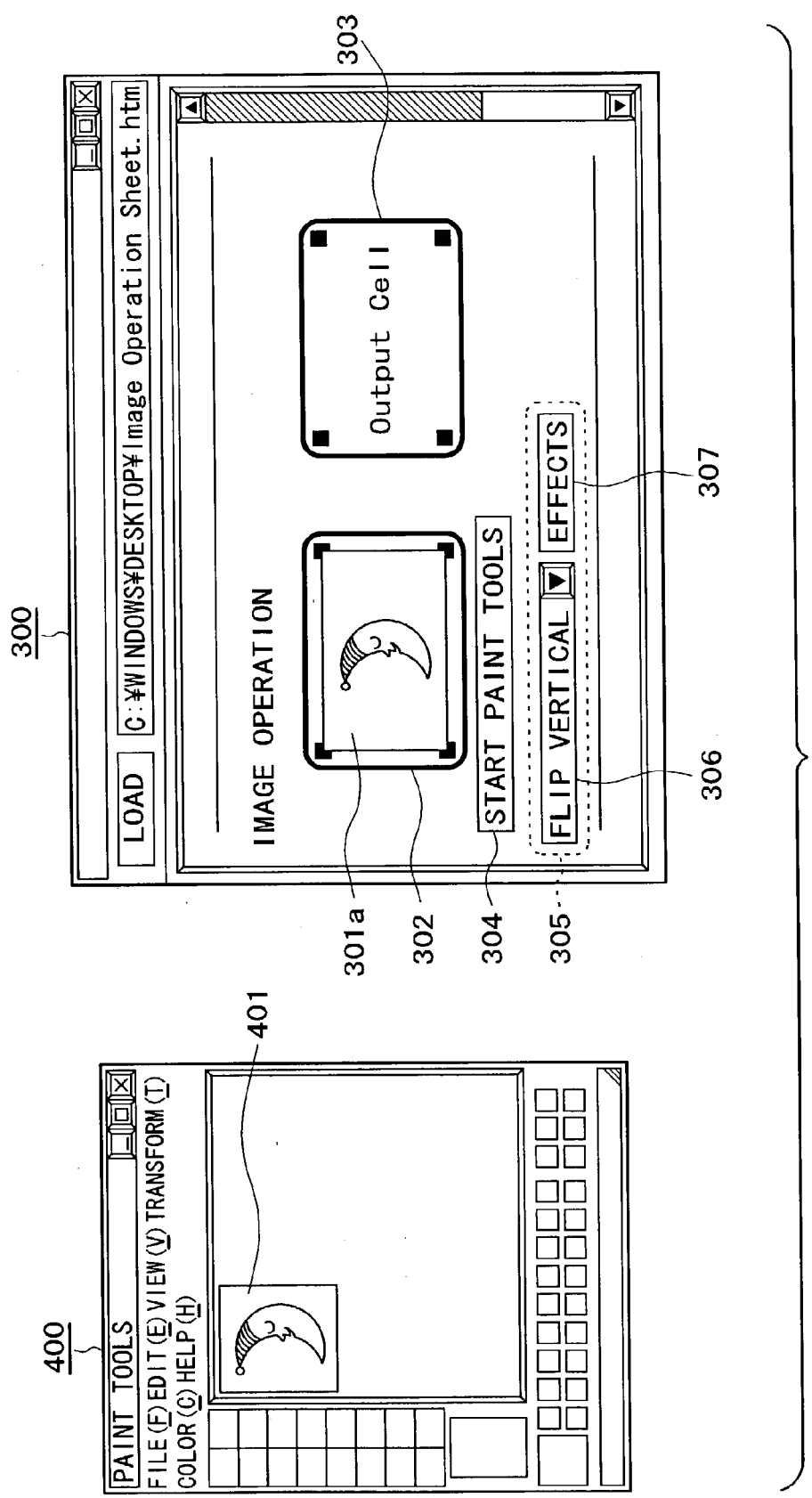
FIG. 9 is another explanatory view depicting a typical function (second example) implemented in the browser window.

FIG. 9 shows a GUI display on the display monitor showing how the second example is implemented. For example, only the browser window 300 of the sharing browser is initially displayed as shown on the right-hand side of FIG. 9. The background of the browser window 300 in FIG. 9 is the same as that in FIGS. 8A and 8B. That is, the same contents data as in FIGS. 8A and 8B are reproduced for this example.

In this case, too, the input cell 302 displays a shared file thumbnail 301a of an image file. This indicates that the target image file to be processed has already been input to the sharing browser.

Suppose now that the user of a client 2 clicks on the start button 304 in the browser window 300. The click triggers execution of a boot-up executable script and starts the paint tool application program that has been installed locally in the client 2 in question. This causes the display screen to display an external application window 400 of the paint tool application apart from the browser window 300, as shown in FIG. 9.

Where the external application program is started up as described above with this embodiment, an executable script automatically causes the application program to open the image file in the input cell 302. As a result, the external application window 400 displays a file image 401 from the image file opened in the input cell 302, as illustrated.

The start button 304 to boot external application programs appears in the browser window 300 on each client 2. Thus, if an external application program is locally installed in any client 2, the user at that client 2 may operate the button to boot the application program in question. This is how the function of starting up external applications is shared by the clients.

When the paint tool application program is started as described above, the user at any client having the program locally installed therein can operate the paint tools. In other words, operating the application program activates the locally retained paint tools to process the shared input image file. This is how the function of operating external applications is shared by the clients.

Figure 10:
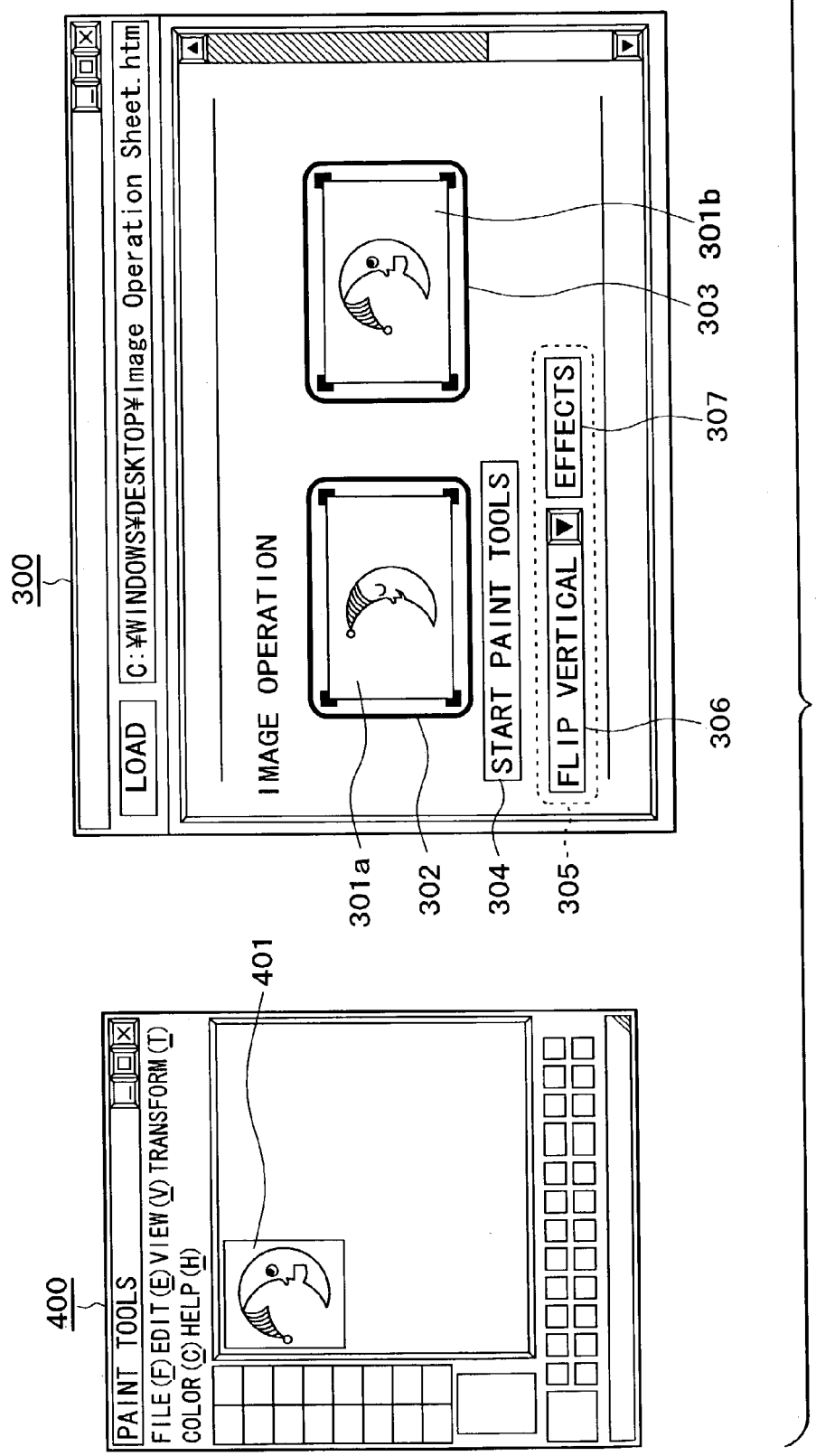
FIG. 10 is another explanatory view depicting a typical function (second example) implemented in the browser window.

The altered image is represented by a shared file thumbnail 301b that is now displayed on the output cell 303 in the browser window 300 as shown in FIG. 10. The image file is then shared by the clients 2.

As described, when an external application program is booted independently, the application window of the booted program is operated to carry out necessary processing. Unlike in the first example, the browser window 300 cannot be operated to handle the external application.

If it is desired to operate an external application program through the browser window 300, the contents data should be so described beforehand as to furnish such necessary operators as the buttons and function operation area. For practical purposes, only the functions of the external application programs that are frequently utilized should be represented by operators where the browser window 300 is retained. By contrast, if the application window of the external application program is opened separately, necessary operations can be performed in the application window while cooperative relations with the contents data are maintained. That means a greater number of functions can be executed in more simplified fashion for file handling and other processing. This makes it possible to easily output the result of, say, more sophisticated file processing.

5-2-3. Third Example (File Processing: Image Composition Processing)

In the foregoing paragraphs, the first example function was described as that of running an external application program in the background for file processing in concert with the contents data. The second example function was shown implementing two features: running an external application program in the background for file processing on the one hand, and booting an external application program to open its application window in which to process files on the other hand. In the description that follows, third through sixth examples will be discussed as functions for more specific file processing in cooperation with appropriate external application programs.

The third example function involves composing a plurality of image files in the browser window 300 of the sharing browser. For example, the contents data corresponding to the function of image composition processing are reproduced to display a browser window 300, such as the one shown in FIG. 11.

In this example, images from two image files are overlaid with each other for composition. For that purpose, the browser window 300 has two input cells 302-1 and 302-2 arranged on the left-hand and right-hand sides therein; two input files are entered into the two input cells. Between the two input cells 302-1 and 302-2 is an output cell 303.

A composition button 308 is provided in the window as a function button for image composition processing. The composition button 308 is displayed immediately below the output cell 303.

In the above setup, the user of the client 2 first drag-and-drops two desired image files onto the input cells 302-1 and 302-2 as target files to be composed. After the drag-and-drop operation, the input cells 302-1 and 302-2 indicate shared file thumbnails 301a-1 and 301a-2, respectively, of input image data.

On the side of the input cell 302-1 are a start button 304-1 for starting the paint tools and a function operation area 305-1 for image rotation. The button and area are used to effect paint and image rotation processing on the image file that has yet to be composed within the input cell 302-1. Likewise, on the side of the input cell 302-2 are a start button 304-2 for starting the paint tools and a function operation area 305-2 for image rotation. The button and area are similarly used to carry out paint and image rotation processing on the image file that has yet to be composed within the input cell 302-2. When executing image composition in that state, the user clicks on the composition button 308.

The click on the composition button 308 starts up in the background a locally installed external application program for image composition processing on the client 2 in question. When booted, the external application for image composition processing proceeds to compose the two images from inside the input cells 302-1 and 302-2. The composition creates a newly composed image file that is output to the output cell 303. The output cell 303 indicates a shared file thumbnail 301b representative of the newly created image file. This new image file is stored locally in the client 2 having done the image composition as well as in the other clients 2 for file-sharing purposes.

It should be noted that the clients capable of sharing operations and functions for image composition processing are only those having the external application program for image composition locally installed therein.

5-2-4. Fourth Example (File Processing: Moving Image Processing)

There exists known application software for moving image processing, i.e., for giving special effects over time on a still image to display the image in such a manner as to be a moving image. The fourth example function involves executing such moving image processing in the browser window 300.

Figure 12:
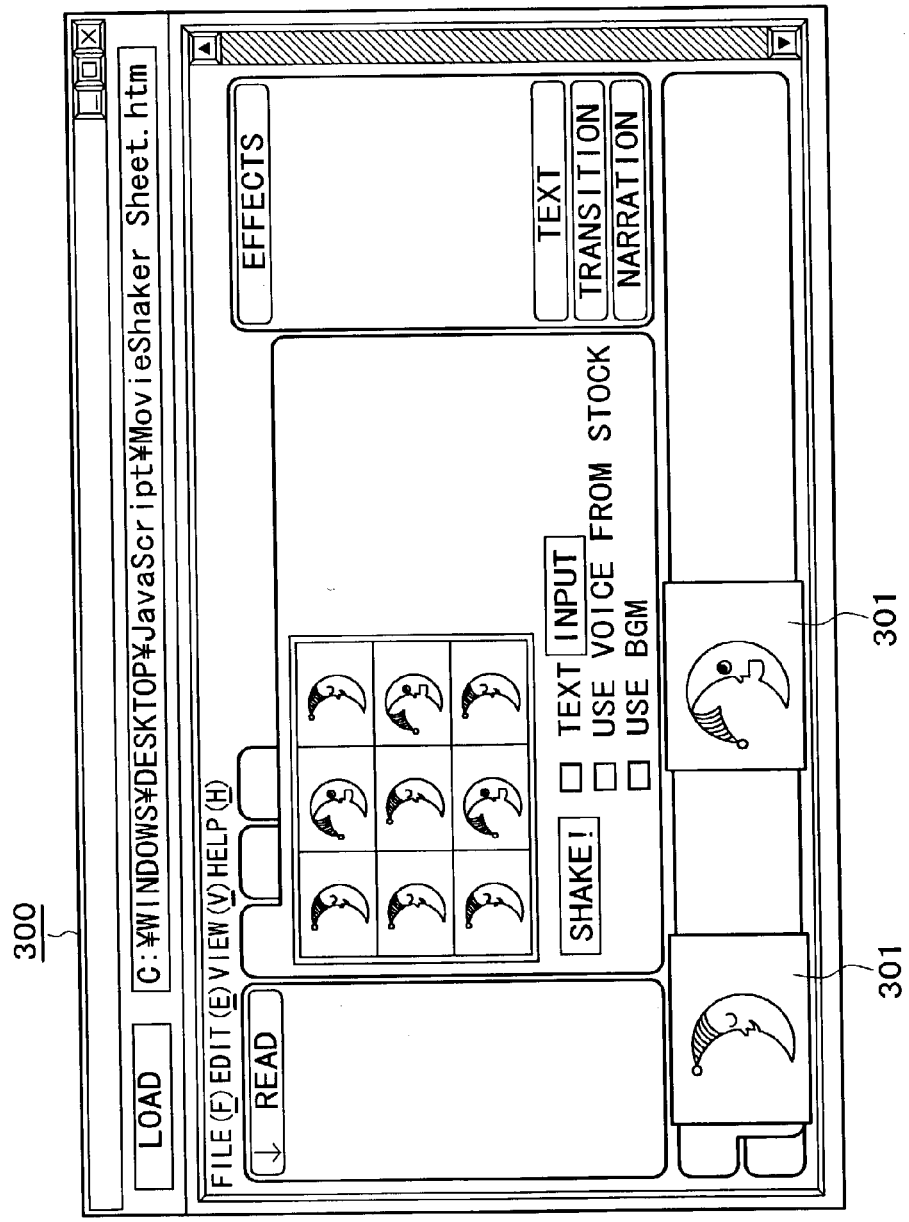
FIG. 12 is another explanatory view depicting a typical function (fourth example) implemented in the browser window.

FIG. 12 shows a typical display of moving image processing as it is carried out in the browser window 300 of the sharing browser. The browser window 300 is programmed in a manner permitting moving image processing and is provided by reproducing the contents data including appropriate executable programs.

In this example, a target image file to be processed is initially drag-and-dropped onto the browser window 300. The input causes a shared file thumbnail 301 representative of the file in question to appear in the browser window 300. Buttons, keys, etc., shown in the window 300 are then suitably operated to execute a moving image processing application program, another external application, on the input image file. The images resulting from the moving image processing are displayed where appropriate in the browser window 300.

The clients 2 can share such moving images on display. Operations to execute the moving image processing are also shared wherever the moving image processing application program is locally installed and available.

5-2-5. Fifth Example (Picked-up Image File Loading)

The foregoing examples were shown to be functions of getting the sharing browser to carry out appropriate processing directly on image files. However, the functionality of the sharing browser is not limited to image processing. That is because the descriptive substance and executable programs making up contents data are designed to provide various functions of the sharing browser in this embodiment. For that reason, the fifth and sixth examples will be described below as functions for processing files other than image files.

Today, camera equipment including, for example, a CCD image pickup device is readily attached or connected to personal computers so that the latter can load image data representative of images picked up by the image pickup device. The loading of image data into the personal computer is made possible by installing into the PC suitable application software for loading picked-up images as image files. The fifth example function involves handling such application software as an external application program for loading picked-up image files in concert with contents data, whereby picked-up images are loaded into the PC through the browser window 300. The function allows an image being picked up in real time to be shared as a shared file by the clients 2 involved.

The contents data for implementing this function include executable programs as well as descriptive substance for loading picked-up image files. Reproducing the contents data displays a browser window 300, such as the one shown in FIG. 13, on the screen of the display monitor. Initially, the browser window 300 alone is displayed; the application window 500 does not appear.

In this browser window 300, an input cell 309 is arranged to appear as illustrated. The window 300 further includes a start button 304 for booting the picked-up image loading application program; an execution button 307a for activating that application program; and another execution button 307b for causing the application program to output picked-up images to the sharing browser.

Figure 13:
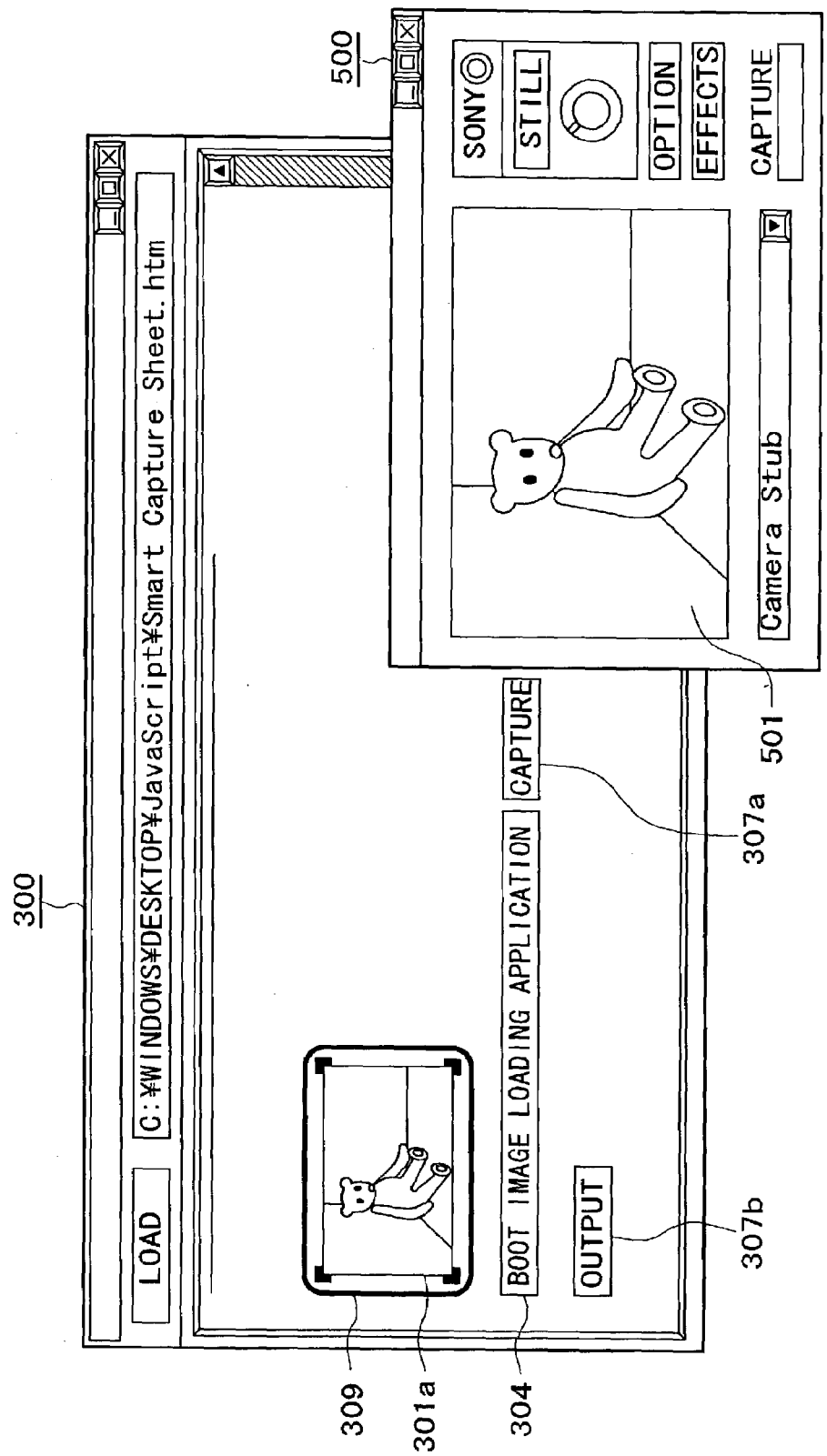
FIG. 13 is another explanatory view depicting a typical function (fifth example) implemented in the browser window.

When the user of one client 2 wants to boot the picked-up image loading application program, the user clicks on the execution button 307a. The click starts up the locally installed picked up image loading application on the client 2 in question. With the application thus booted, the application window 500 of the program appears as shown in FIG. 13. The window 500 includes a picked-up image area 501 that displays the image being picked up in real time by camera equipment in such a manner as to be a moving image.

Suppose that the user of the client 2 on which the picked-up image loading application is being active operates on the execution button 307a indicated as "Capture" in the browser window 300. The moment the execution button 307a is operated on, the picked-up image in the picked-up image area 501 of the application window 500 freezes, i.e., a still image state is brought about. At this point, the picked-up still image in the picked-up image area 501 is displayed in the input cell 309 within the browser window 300. This means that the image picked up by the camera equipment is loaded by the picked-up image loading application as picked-up image data and that the picked-up image data thus loaded are output to the sharing browser. As described, once the picked-up image data have been transferred to the input cell 309 in the browser window 300, the picked-up image data may be shared by the clients 2 involved.

Another execution button 307b indicated as "Output" in the browser widow 300 may also be furnished. This button is utilized, for example, as follows. When the execution button 307a indicated as "Capture" is operated, the picked-up image in the picked-up image area 501 of the application window 500 shifts into a still image state for a predetermined time period. In that still image state, operating on the execution button 307b indicated as "Output" loads the still picked-up image into the input cell 309 inside the browser window 300.

Where this function is to be utilized, only one client needs to be connected to camera equipment; no other client 2 is required to be furnished with the camera equipment for image pickup. In this case, operations of the start button 304 and execution buttons 307a and 307b are shared, for example, as follows. When the camera-equipped client 2 starts up the picked-up image loading application program to input picked-up image data, the input data are transmitted to the other clients 2. The other clients 2 can then display the same picked-up image data using the locally booted picked-up image loading application program. Thereafter, operating on the execution button 307a indicated as "Capture" on any one client 2 displays on its monitor screen a still image obtained the moment the execution button 307a is operated on.

5-2-6. Sixth Example (File Processing: Text-to-speech Reading)

The foregoing examples were described as functions of processing images. However, the invention is not limited to this. The sharing browser of this embodiment also permits sharing by clients of files such as document files, audio data files, and moving image data files in diverse formats other than the image files. The sixth example function involves processing files other than those associated with images. For example, the file processing may be text-to-speech reading whereby the text of document files is turned into audible speech.

Figure 14:
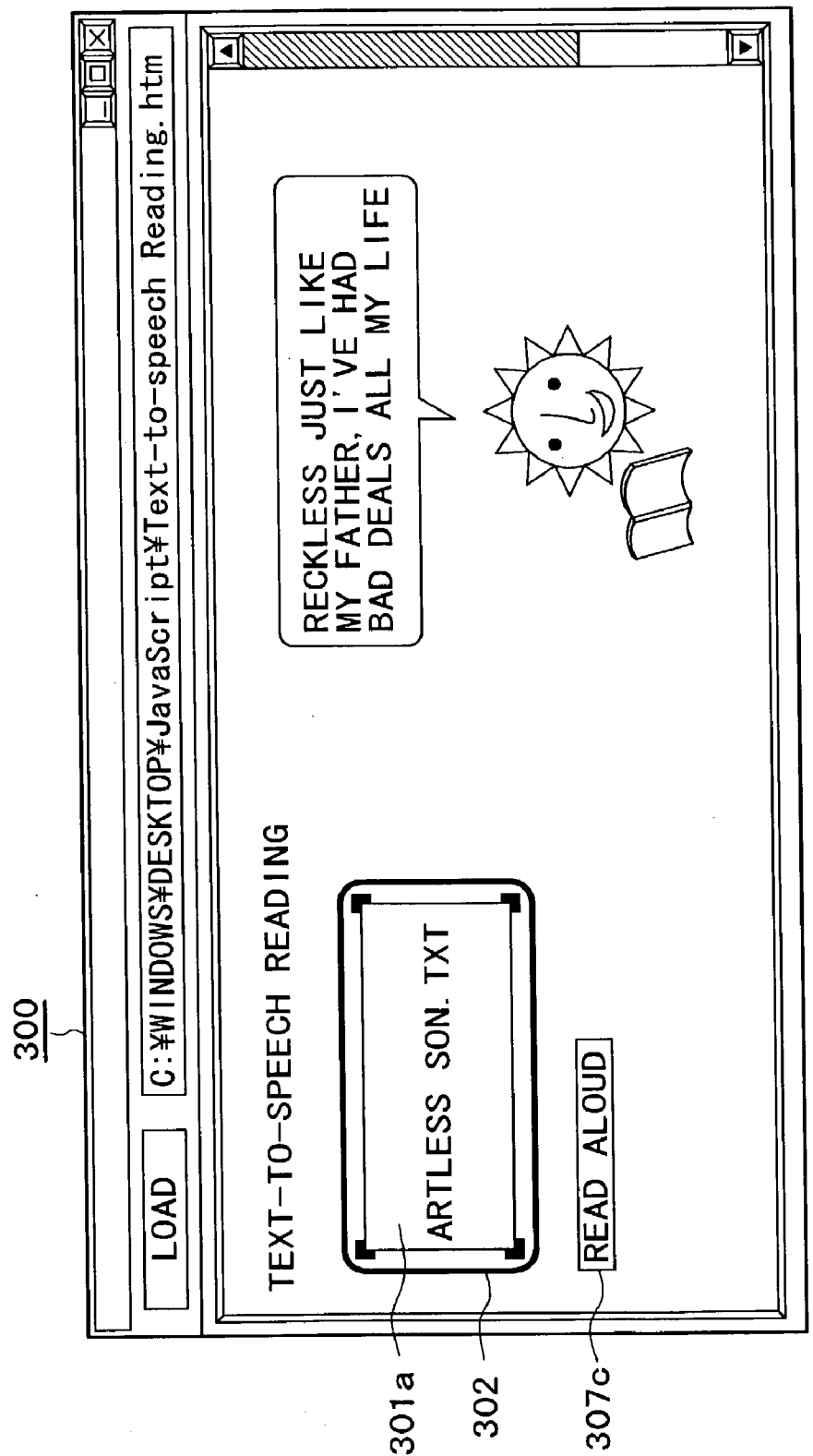
FIG. 14 is another explanatory view depicting a typical function (sixth example) implemented in the browser window.

FIG. 14 shows a browser window 300 presented by reproducing and outputting the contents data including a text-to-speech reading capability. As illustrated, the browser window 300 includes an input cell 302 onto which the user of the client 2 drag-and-drops a desired document file for text-to-speech reading. In this example, the result of the file processing is an audio output, so that no output cell 303 is displayed in the window; the output cell 303 is used by the user of each client 2 primarily to view the result of file processing.

Suppose that with a document file placed onto the input cell 302 as illustrated, the user of a client 2 clicks on an execution button 307c indicated as "Read aloud." The click causes a locally installed external application program having the text-to-speech reading capability to start up on the client 2 in question, the application program carrying out steps to turn into speech the document file placed in the input cell 302. As a result of the file processing, the personal computer working as the client 2 outputs the text of the document file in speech form. The audio output of text-to-speech reading takes place at about the same time on the other clients 2 as well. This is how the sixth example function allows the clients 2 involved to share the result of the file processing.

As a variation of the sixth example function, it is obviously possible to constitute contents data having an audio output capability that reproduces, for example, an audio data file entered into the input cell of the browser window 300.

6. Processing Examples

Figure 15:
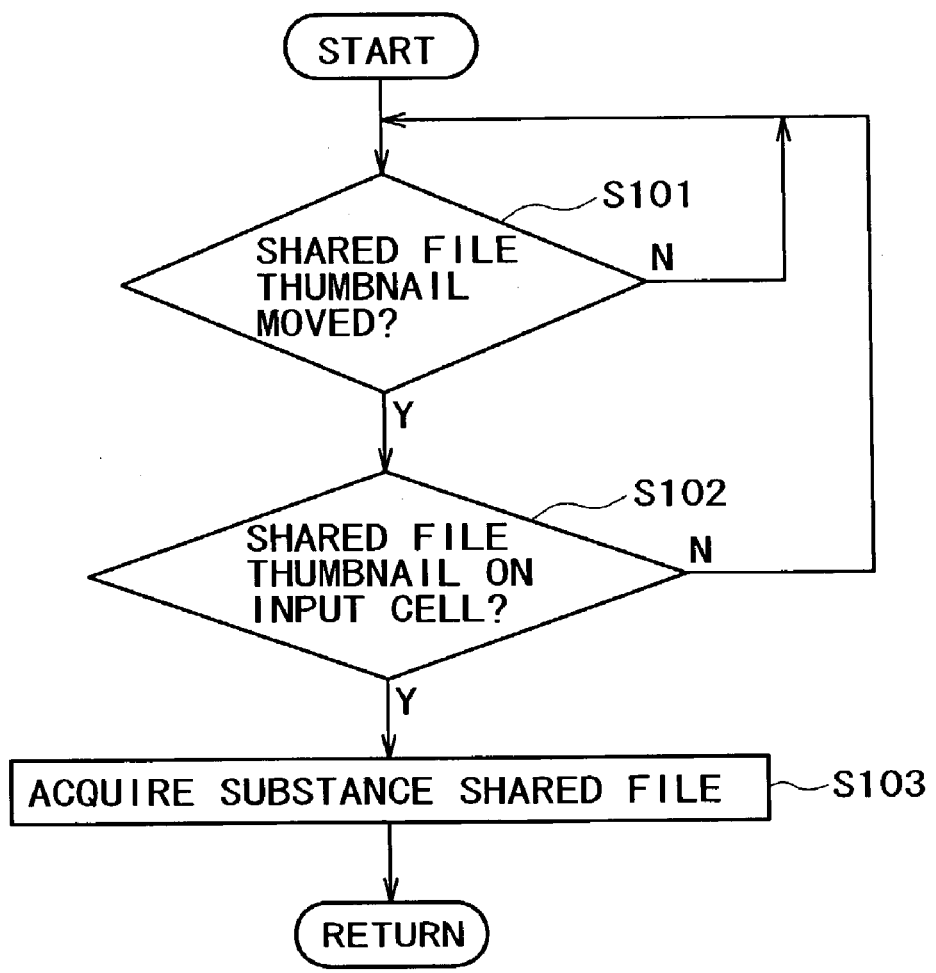
FIG. 15 is a flowchart of steps constituting a file input process.
Figure 16:
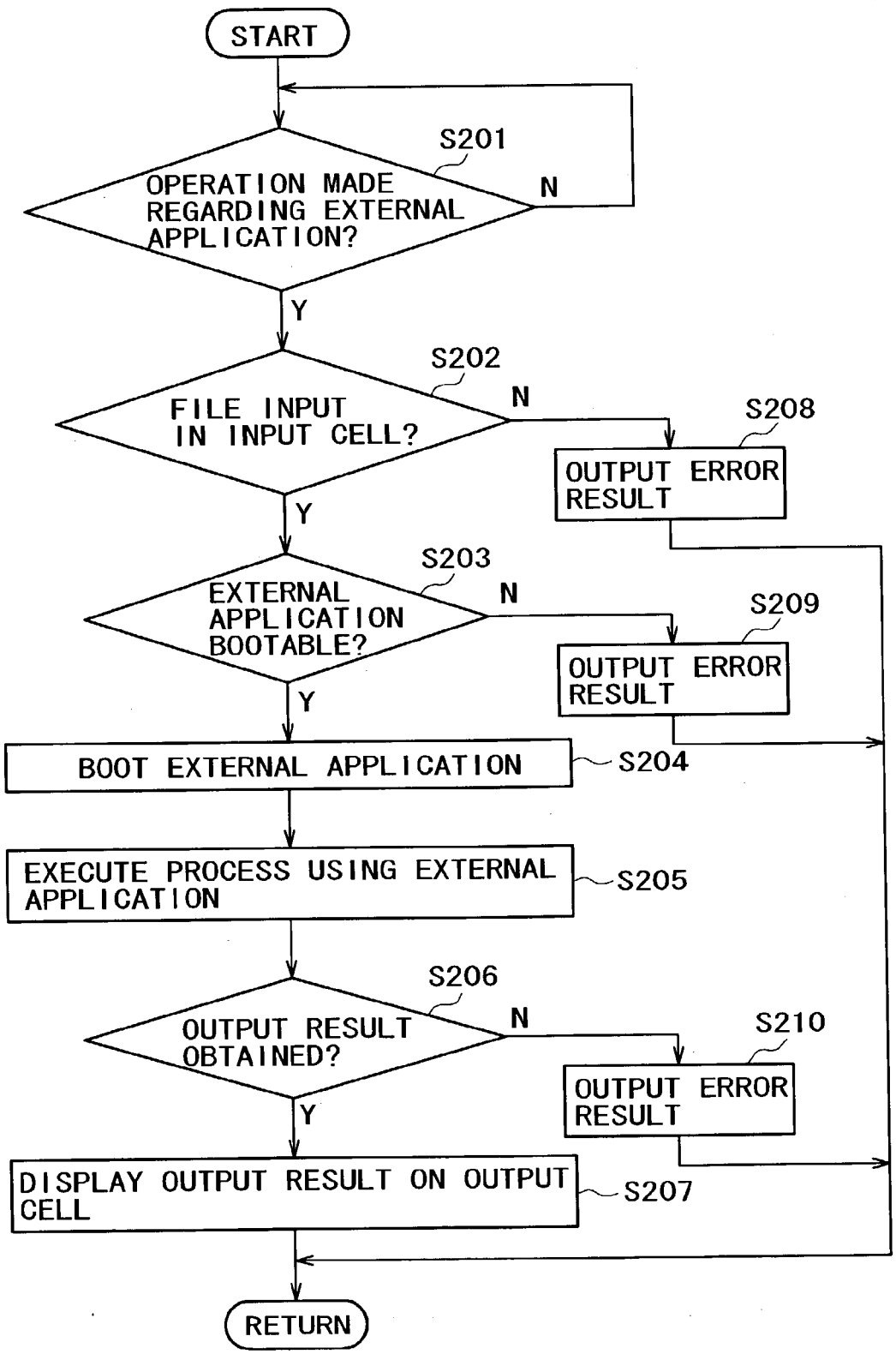
FIG. 16 is a flowchart of steps carried out in response to operations of buttons, keys, etc.

Described below with reference to the flowcharts of FIGS. 15 and 16 is how programmed structures of contents data typically work to implement the above-described functions in the browser windows 300.

One sharable function in the browser window 300 is the file processing function as mentioned above. When the function is executed to get an external application program to process a file, the target file is, for example, placed onto the input cell 302 in the browser window 300. The external application program is designed to process the file in the input cell 302 as instructed by the contents data involved.

How a file is input, typically by drag-and-drop, will now be described by referring to the flowchart of FIG. 15. The steps in FIG. 15 are carried out by the CPU 201 when the sharing browser (application) is started under the control of an operating system on the client 2, with suitable contents data reproduced and output onto the browser window 300. In this case, the CPU 201 performs the steps by interpreting as needed the script descriptions making up the contents data, as well as the executable scripts included in the contents data.

As mentioned earlier, a shared file thumbnail 301 can be positioned where desired through drag-and-drop on the screen of any client 2. In step S101 of FIG. 15, the CPU 201 waits for the shared file thumbnail 301 to be moved by drag-and-drop. When it is determined that the thumbnail 301 has been moved, step S102 is reached.

In step S102, a check is made to see whether the shared file thumbnail 301 thus moved is on the input cell 302. If it is determined that the thumbnail 301 is not on the input cell 302, then step S101 is reached again. If the thumbnail 301 is found to be on the input cell 302, step S103 is reached.

In step S103, the substance of the shared file thumbnail 301 on the input cell 302 is acquired as the input file. Specifically, the substance of the input file is retained locally by, say, a client A having initially placed the file onto the input cell 302 through drag-and-drop. The client A is accessed in step S103 via the network by another client requesting the locally stored input file from the client A. After acquiring the input file from the client A, the requesting client places the file into its local storage.

The processing above performed by any one of the clients other than the client A allows the interconnected clients to share the input file. The clients may also share the function of processing the input file as long as the corresponding external application is locally installed.

Described below with reference to the flowchart of FIG. 16 is how various buttons and the function operation area are operated in the browser window 300 onto which contents data are reproduced and output. The operations are performed to implement diverse kinds of file processing such as those explained above with reference to FIGS. 8A through 14.

The steps in FIG. 16 are also carried out by the CPU 201 when the sharing browser (application) is started under the control of the operating system on the client 2, with suitable contents data reproduced and output onto the browser window 300. In this case, the CPU 201 performs the steps by interpreting as needed the executable scripts included in the contents data.

In step S201, a check is made to see whether any operation is carried out in the browser window 300 to give functional instructions to an external application program. More specifically, the operations to designate functional instructions are made up of those performed on the start button, execution buttons, or the function operation area in the browser window 300. The external application responds appropriately to any of these operations.

If in step S201 it is determined that an operation has been performed, step S202 is reached. In step S202, a check is made to see whether a file has already been input to the input cell 302. If it is determined that no input file exists in the input cell 302, step S208 is reached in which an error result is output. For example, the error message "No input file is specified" may be arranged to appear in the browser window 300.

If in step S202 it is determined that an input file exists in the input cell 302, step S203 is reached. In step S203, a check is made to see whether the relevant external application program can be started. More specifically, a check is made in step S203 to see whether the external application program corresponding to the operation determined to have been performed in step S201 resides locally in the client 2 having carried out the function-designating operation. It should be noted that even where the suitable external application program does exist, it cannot be booted if the format of the input file does not comply with the external application, if some error has occurred, or if there exist certain restrictions on the use of the application in question. If any of these cases applies, the result of the check in step S203 is negative.

If in step S203 the external application is determined to not exist locally in the client 2 or if the locally residing application program cannot be started due to some error or restrictions, then step S209 is reached. In step S209, an error result is output in the browser window 300 in the form of, say, the error message "External application cannot be booted". If the result of the check in step S203 is affirmative, step S204 is reached.

In step S204, the external application program corresponding to the operation performed in step S201 earlier is booted locally. The booting instruction is given, for example, in accordance with an executable script included in the contents data.

In step S205, the booted external application program carries out necessary processing on the input file. The actual processing of step S205 differs between two cases: where an execution button is operated on in step S201, and where the start button is clicked on to start the external application.

Where the execution button was operated on earlier, the process to be carried out by the external application program is controlled automatically by the CPU 201. This makes it possible, in each of the above-described file processing examples, to execute appropriate file processing in the background in response to the operation of the execution button.

Figure 11:
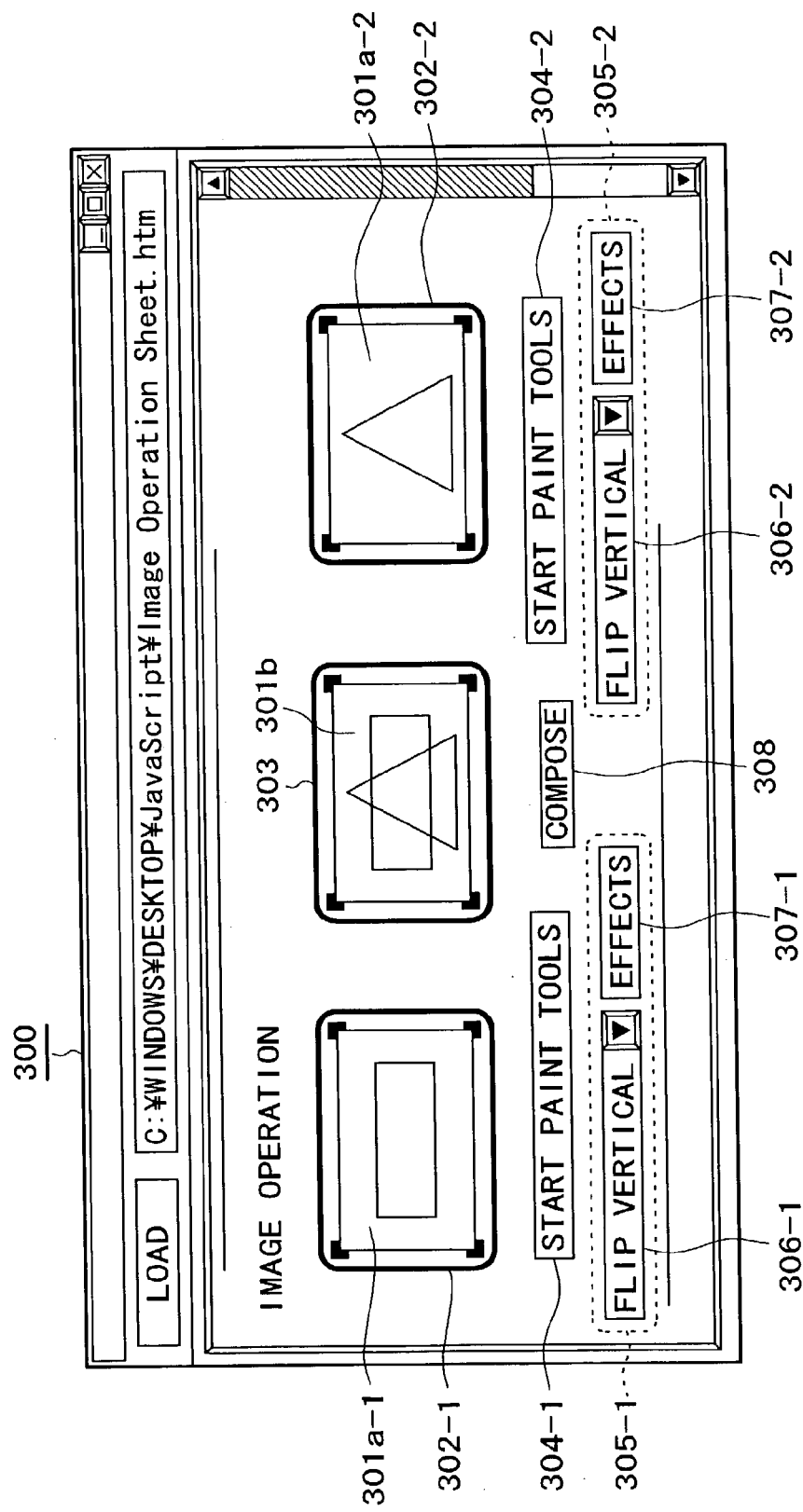
FIG. 11 is another explanatory view depicting a typical function (third example) implemented in the browser window.

For the first example through the sixth example functions mentioned above, the process in step S205, for example, brings about the following:

1: Operating on the execution button 307 indicated as "Effect" rotates the image (first example; FIGS. 8A and 8B).
2: Operating on the execution button 308 indicated as "Compose" puts images together (third example; FIG. 11).
3: Operating on any of the buttons in the browser window 300 provides the corresponding moving image processing (fourth example; FIG. 12).
4: Operating on the execution button 307a indicated as "Capture" and on the execution button 307b indicated as "Output" loads the picked-up image and outputs the picked-up image data to the browser window 300 (fifth example; FIG. 13).
5: Operating on the execution button 307c indicated as "Read aloud" brings about text-to-speech reading.

On the other hand, where the start button was clicked on earlier to start the external application program, the process in step S205 takes place as follows. Specifically, as shown in FIGS. 9 and 10, an operation performed on the start button 304 boots the external application program to open its application window independently of the browser window 300. The user proceeds with file processing by operating on the application window of the external application program. Thus, the process in step S205 is executed as programmed in the external application. The input operations by the user cause the CPU 201 to control the external application in such a manner that the latter effects the relevant file processing.

The process in step S205 handles the file as described above before giving the result. In step S206, a check is made to see whether an output result of the file processing has been obtained. If the file has simply been erased or if no change has been made to the file, that means no output result has been acquired. If in step S206 it is determined that no result has come out of the file processing, step S210 is reached in which an error result is output. In this case, the error result may be given in the browser window 300 in the form of, say, the error message "No result from file processing".

If in step S206 it is determined that an output result of the file processing exists, step S207 is reached. In step S207, the result of the processing is output onto the output cell 303 as described earlier in connection with the file processing examples. Because an output file has been derived anew from the input file, a thumbnail image for the output file is generated and displayed as a shared file thumbnail 301 on the output cell 303 in overlaid fashion.

In the case of particular file processing such as text-to-speech reading as discussed for the sixth example above, no file is output to the output cell 303 in step S207. In this case, the output of the file processing involves, for example, the external application program executing text-to-speech reading in step S205 so that the text is read out aloud and not displayed on the screen.

7. First Variation: System Configuration in Effect When External Application Programs are Arranged to be Purchased As has been discussed so far, the file sharing system of this embodiment requires that each of the interconnected clients 2 download contents data from the contents server 1 for reproduction and output through the sharing browser and that each of the clients 2 implementing file processing functions be furnished with locally installed external applications whose uses are designated by the contents data.

As one way of system management by the contents server 1, external application programs may be distributed from the server to clients on a chargeable basis. In other words, users of the clients are to purchase external application programs from the server 1. In such a setup, the external applications should preferably be purchased as easily as possible by the users in need of them. What follows is a description of a system configuration as one variation of the invention allowing client users to purchase external application programs with ease.

Figure 17:
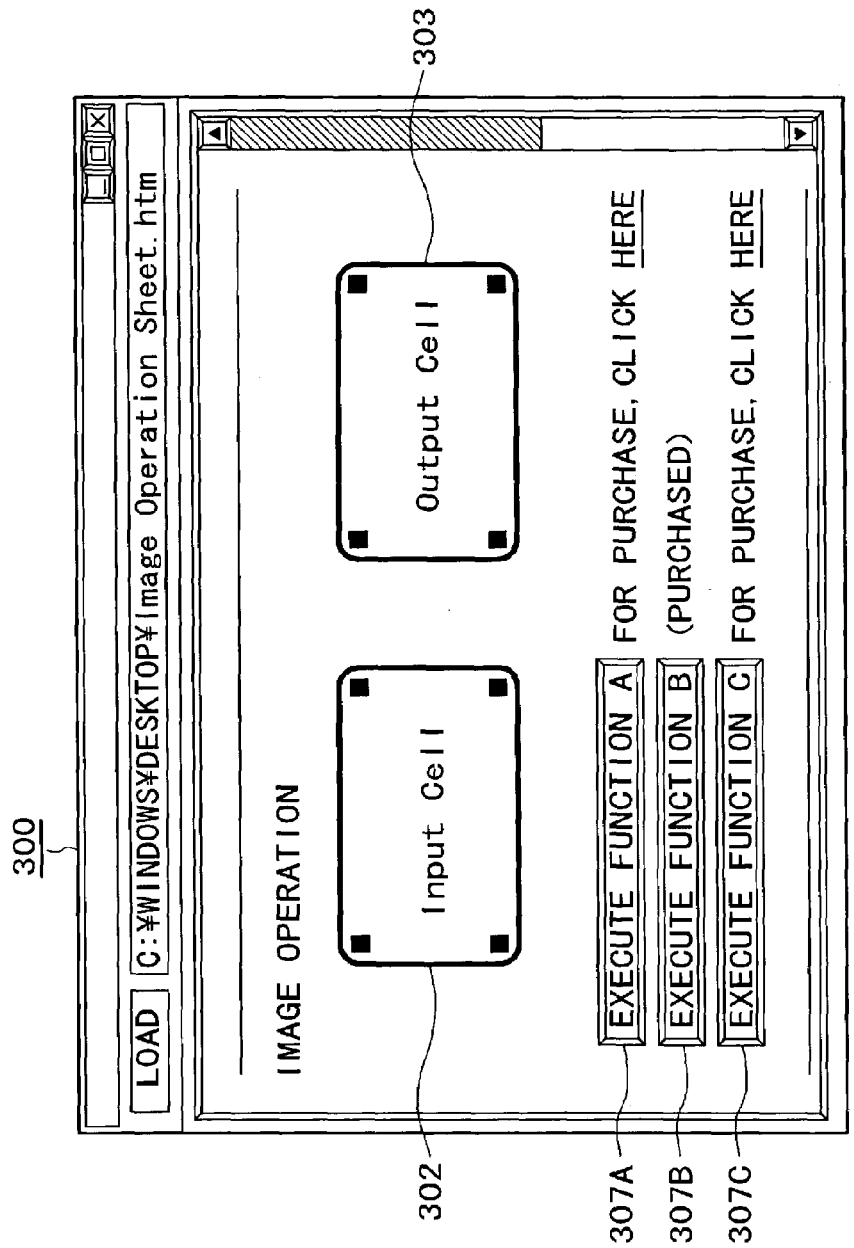
FIG. 17 is an explanatory view showing a typical browser screen display of contents data (first variation) in effect when an external application program is arranged to be purchased.

FIG. 17 shows a browser window 300 appearing on the screen when external application programs are arranged to be purchased. In FIG. 17, the components having identical or corresponding functions to their counterparts in the other drawings showing the browser window 300 are designated by like reference numerals, and their descriptions are omitted where redundant.

The browser window 300 in FIG. 17 includes, for example, three execution buttons, 307A, 307B and 307C, all intended to trigger execution of the functions defined by the contents data being reproduced. The number of execution functions may be varied depending on the number and types of functions to be implemented by the contents data in question.

For this example, it is assumed that operating on the execution buttons 307A, 307B and 307C implements functions A, B and C, respectively. The functions A, B and C correspond to different external application programs. Thus, where any one client 2 is to implement all of these functions A, B and C, the corresponding external application programs must be installed locally in the client beforehand.

Suppose that the client 2 displaying the browser window 300 has an external application program installed therein corresponding to the function B and that external applications are not yet installed corresponding to the functions A and C. In such a case, this client 2 can employ only the function B out of the three functions. Operating on the execution button 307B carries out the function B. The remaining execution buttons 307A and 307C are shown disabled and leave the functions A and C inactive even if operated.

In the browser window 300 above, the execution buttons for the functions A, B and C are given indications such as "Purchased" or "For purchase, click here" depending on whether the respective function is installed or not. In this example, the external application corresponding to the function B has already been installed, so that the execution button 307B for the function B is indicated as "Purchased" on the right side in the window 300. The external applications corresponding to the functions A and C have yet to be installed, so that the execution buttons 307A and 307C are each given the indication "For purchase, click here" on the right side.

Upon reproduction and output of contents data, the purchase status of the external application programs is determined by the appropriate executable script in the contents data which searches through a local drive to determine whether the external applications corresponding to the functions A, B and C have been installed. Once determined, the purchase status of the external application programs is displayed in a suitable form in the browser window 300.

Suppose that the user of this client 2 wants to use the function A as well. Currently, the corresponding external application displays the indication "For purchase, click here". The underlined word "here" provides a clickable link to a Web page. That is, clicking on the part "here" provides access to the website from which to purchase the external application program corresponding to the desired function. The relevant contents data derived from the Web page are reproduced and output onto the browser window 300 of the sharing browser.

The user then makes purchasing arrangements through suitable operations, not shown, in order to download the external application corresponding to the function A and to have the downloaded program installed locally in the client 2. When the display status of the browser window 300 in FIG. 17 is restored, the indication "Purchased" appears to the right of the execution button 307A relative to the function A. Thereafter, the execution button 307A is shown enabled and operable on this client 2.

With this embodiment, as described, the user can perform operations to purchase external application programs for implementing desired functions from inside the browser window 300 which is originally intended to carry out such functions as those for file processing. This feature is implemented, for example, by getting the contents data to include scripts or like descriptions for enabling operations to purchase external applications, the contents data being reproduced and output onto the browser window 300.

When the browser window 300 is being displayed by the sharing browser for sharing files, the user may perform relevant operations in the window 300 to complete the necessary arrangements promptly to purchase a desired external application program. The external application thus purchased is readily installed into the user's client.

By contrast, there has often been the case where external application programs need to be installed from package media. In that case, the package media must be purchased first by going through more or less complicated buying procedures. They hardly constitute the case of a prompt purchase of the desired application followed by a quick program installation, which is characteristic of the inventive arrangements.

There is also the case where a server that retains external application programs is accessed via the Internet by a client user so that the user may download a desired application program from the server and locally install the downloaded program in the client. In that case, the user is unable to access the server directly through the browser window 300 of the sharing browser; the user must gain access to the server by designating an appropriate server address in the browser, such as a URL, before performing operations to purchase and download the necessary external application program.

FIG. 18 is a flowchart of steps performed by the contents server 1 and client 2 for transmitting and receiving external applications therebetween where such programs are arranged to be purchased by the client user in the above-described setup. Of the steps shown, those on the side of the client 2 are performed by the CPU 201 and those of the contents server 1 are carried out by the control unit 103 in accordance with the executable applications 113.

Suppose now that, as described above with reference to FIG. 17, the user at the client 2 has clicked on the underlined part in the indication "For purchase, click here." The click causes step S301 to be reached in which a request is made for an external application purchase page. More specifically, the contents server 1 is accessed in step S301 by use of the address of the clicked link to the page, whereby the purchase page is requested.

In step S401, the contents server 1 waits for a purchase page request to arrive. If in step S401 it is determined that a page request has been received, step S402 is reached.

In step S402, an authentication check is made to see whether the requesting client is an authorized client. For example, the purchase page request from the client 2 may include such user information as a user ID and a password unique to each user. The user database 112 in the contents server 1 has numerous items of such user information stored in database form, in which registered users are associated with their user IDs and passwords.

Thus, what takes place in step S402 is an authentication process based on the user ID, password or other suitable user information transmitted from the requesting client 2. When the client is authenticated as a legitimate user, step S403 is reached. If the authentication process determines that the user information is invalid, the requesting client is notified of the failed authentication and the process exits, although not shown in FIG. 18.

Where the client user is to include the user information in the purchase page request originating from the client, the client is preferably arranged to display a dialog box upon access to the server. The dialog box is, for example, in a GUI format that prompts the user to input the user information, such as the user ID and password. With the necessary information entered by the user into the dialog box, the purchase page request is transmitted from the client to the server. This is how the purchase page request is typically transmitted along with the user information.

The authentication process in step S402 is followed by step S403. The substance of the purchase page consists of contents data that can be reproduced and output onto the browser window 300 by the sharing browser. The contents data making up the purchase page are stored in the contents database 110. In step S403, a search is made through the contents database 110 for the requested purchase page contents data. In step S404, the purchase page contents data retrieved following the search are transmitted to the requesting client 2.

In step S302, the client 2 waits for the purchase page requested in step S301 to be received. If in step S302 it is determined that the requested page has been received, step S303 is reached. In step S303, the received contents data making up the purchase page are reproduced and output onto the browser window 300 for display.

When the purchase page is displayed, the user of the client 2 may carry out operations to make the purchase. When an operation is performed by the user to finalize the purchase decision, step S304 is reached in which a purchase request is transmitted to the contents server 1. The purchase request is sent, for example, together with an external application ID identifying the external application program desired to be purchased.

In step S405, the contents server 1 waits for the purchase request to arrive. When it is determined that the purchase request has been received in step S405, step S406 is reached. In step S406, a search is made, for example, through the external application database 111 for the desired external application using its application ID as the search key. In step S407, the external application program retrieved following the search is transmitted to the client 2 having made the purchase request. Step S408 is then reached in which the contents server 1 performs a charging operation to charge the client user for the requested external application program.

In step S305, the client 2 waits for the external application program to be received. When it is determined that the external application has been received, step S306 is reached. In step S306, the received external application program is installed locally into the client 2.

8. Second Variation: System Configuration in Effect When Client Addresses are Managed by a Server When a network system practiced as a second variation of the invention causes each of the clients 2 involved to run a sharing browser for sharing purposes, each client needs the addresses of the other clients viewing identical contents data at the same address (URL) using the sharing browser. In that setup, exchanging their addresses allows the clients to recognize one another and establish the necessary connections therebetween for sharing files. On the Internet, for example, the address of each client is an IP address.

With the embodiment described above, the clients were shown exchanging their addresses over the network in order to recognize each other by address. What characterizes the network-based system embodying the invention, however, is that it is always the clients 2 that access the contents server 1. That means the contents server 1 can receive and retain address information from all clients 2 for management purposes. The second variation of this invention, to be explained below, takes advantage of the address management capability of the contents server 1 to allow the clients 2 to establish connections with one another.

FIG. 19 shows conceptually how the network system of the second variation works. The system allows, for example, three clients 2-1, 2-2 and 2-3 to view and share the same contents data using their repetitive sharing browsers. In this setup, each of the clients 2-1, 2-2 and 2-3 gains access to the contents server 1 by designating the URL of the same contents data. Upon access to the contents server 1, the clients 2-1, 2-2 and 2-3 submit their address information. When transmitting any designated contents data to a given client 2, the contents server 1 retains the address of that client in association with the uploaded contents data. Under this scheme, the address information for each of the clients 2-1, 2-2 and 2-3 is stored by the contents server 1.

Tapping the stored address information, the contents server 1 gives the client 2-1 the address information for the clients 2-2 and 2-3. Likewise, the contents server 1 informs the client 2-2 of the address information for the clients 2-1 and 2-3 and notifies the client 2-3 of the address information for the clients 2-1 and 2-2. That is, the contents server 1 supplies each client 2 viewing certain contents data with the addresses of the other clients 2 viewing the same contents data. Using the address information given by the contents server 1, the clients 2-1, 2-2 and 2-3 establish connections therebetween for sharing purposes.

For example, if address information is exchanged between clients 2 without the intervention of the contents server 1, the connections for sharing are established only between the particular clients that have decided to share resources using their sharing browsers, with some minor modifications necessitated depending on the system configuration. By contrast, the second variation of the invention gets the contents server 1 to manage client address information and to inform the configured clients thereof. In this setup, unspecified clients 2 can share resources between them as long as they view the same contents data using their sharing browsers. Depending on what the contents data offer, the clients in the system can share advanced levels of entertainment and functionality.

Although the above-described second variation of the invention allows one contents server 1 to upload both contents data and external application programs to clients, the invention is not limited to this. As an alternative, the uploading function may be implemented on a distributed basis. More specifically, there may be one contents server 1 for retaining and uploading the contents data and another server for storing and uploading the external applications. These servers may be located, for example, on the Internet.

Even if the system management scheme of the second variation above is not adopted, with no contents server 1 located on the network, the clients 2 alone can still share files between them using the sharing browser. In that case, the contents data to be reproduced and output by each client 2 are stored, for example, in a specific storage area of a local hard disc drive attached to a particular client 2. In other words, one particular client 2 may be arranged to act as a contents server. The remaining clients 2 access the client 2 working as the server to retrieve necessary contents data from the latter for reproduction and output through the sharing browser.

As another alternative, the contents data may be distributed using package media, such as CD-ROMs. In this case, the clients involved may reproduce and output the same contents data from the package media.

Where the system management scheme of the second variation above is not adopted, no constraints are imposed on how the user of each client 2 is to acquire and install external applications. For example, the client user may download desired external application programs from the contents server 1 if the latter offers them; the user may download necessary external applications from any other suitable application server available; or the user may install the applications from package media.

As described and according to the invention, the clients involved (terminal apparatuses or information processing apparatuses) each reproduce and output the same contents data in the form of the browser screen. The clients exchange sharing information corresponding to any operations that have been performed on the contents data by any one client. Based on the sharing information, the results reflecting the operations are made to appear on the browser screen of each client.

In this setup, performing the operations to enter data such as files enables these files to be shared by the clients. The clients are also allowed to share functions such as those of processing the shared files as desired. It is also possible to acquire and control external applications through the browser screen to implement necessary functions.

In other words, the inventive system permits sharing by clients of various operating functions that can be implemented by application programs made up of the contents data. There can be a large number of functions that may be brought about by these application programs. Between the clients involved, it is possible to share not only files but also diverse functions such as those for file processing by use of the programs consisting of the contents data. As such, the inventive sharing system is much more convenient than related-art setups of application programs merely sharing files.

According to the invention, necessary functions are implemented by starting up external application programs in response to suitable operations performed on the browser screen on which contents data are reproduced and output. The client user may simply operate on the browser screen of the client to purchase and download desired external applications at about the same time. With all external applications arranged to be purchased as needed, the inventive scheme makes it very easy for the user to purchase and install into each client the necessary external applications.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A computer-readable medium recorded with computer program instructions for carrying out a method of processing information at a given one of a plurality of terminal apparatuses, the plurality of terminal apparatuses being connected to each other over a network whereby content data is shared among the plurality of terminal apparatuses, said method comprising:

reproducing and outputting the shared content data as a browser object at the given one of the plurality of terminal apparatuses;

initiating an application program stored at the given one of the plurality of terminal apparatuses to enable at least one operation to be performed on the browser object at that terminal apparatus;

transmitting information to and receiving information from other ones of the plurality of terminal apparatuses over a network by the given one of the plurality of terminal apparatuses, each one of the other ones of the plurality of terminal apparatuses being capable of reproducing and outputting the shared content data as the browser object, the information including shared information which indicates that the at least one operation was performed on the browser object by at least one of the plurality of terminal apparatuses using the application program stored at the at least one of the plurality of terminal apparatuses;

performing, based on the shared information, the at least one operation on the browser object using the application program stored at the given one of the plurality of terminal apparatuses to obtain a result; and reproducing and outputting the result of the at least one operation at the given one of the plurality of terminal apparatuses.

2. The computer-readable medium according to claim 1, wherein said enabling step includes enabling a data input operation to be performed on the browser object at the given one of the plurality of terminal apparatuses;

said information transmitting and receiving step transmits the data inputted at the given one of the plurality of terminal apparatuses and receives the data inputted by a data input operation performed at another one of plurality of terminal apparatuses; and said processing sharing step includes applying the inputted data input or the received data to the browser object at the given one of the plurality of terminal apparatuses.

3. The computer-readable medium according to claim 1, wherein the browser object depicts the content as a cell for inputting and outputting data or as an operator for executing an operation;

said method further comprising:

controlling the application program stored at the given one of the plurality of terminal apparatuses to implement a function when the cell or the operator is operated in said enabling step.

4. A network system comprising:

a network; and a plurality of terminal apparatuses connected to each other over the network whereby content data is shared among said plurality of terminal apparatuses;

each one of said plurality of terminal apparatuses including:

reproducing means for reproducing and outputting the shared content data as a browser object, enabling means for initiating an application program stored at that terminal apparatus to enable at least one operation to be performed on the browser object, transmitting and receiving means for transmitting information to and receiving information from other ones of said plurality of terminal apparatuses over the network, the information including shared information which indicates that the at least one operation was performed on the browser object by at least one of said plurality of terminal apparatuses using the application program stored at the at least one of said plurality of terminal apparatuses, and processing means for performing, based on the shared information, the at least one operation on the browser object using the stored application program to obtain a result, said reproducing means reproducing and outputting the result of the at least one operation.

5. The network system according to claim 4 wherein said enabling means enables a data input operation to be performed on the browser object;

said transmitting and receiving means transmits the data inputted at that terminal apparatus and receives the data inputted by a data input operation performed at another of said plurality of terminal apparatuses; and said processing sharing means applies the inputted data or the received data to the browser object.

6. The network system according to claim 4, wherein the browser object depicts the contents data as a cell for inputting and outputting data or as an operator for executing the at least one operation; and each of said plurality of terminal apparatuses further comprises:

controlling means for controlling the stored application program to implement a function when the cell or the operator is operated by said enabling means.

7. The network system according to claim 4, further comprising:

a server which stores the shared content data and which is connected to the plurality of terminal apparatuses over the network; and wherein each of said plurality of terminal apparatuses further comprises:

content data acquiring means for accessing the server over the network to acquire the shared content data.

8. The network system according to claim 7, wherein said server comprises:
- address acquiring means for acquiring a network address from each one of the plurality of terminal apparatuses over the network, and
- reporting means for reporting the network address acquired from other ones of the plurality of terminal apparatuses to a given one of said plurality of terminal apparatuses; and
- each of said plurality of terminal apparatuses further comprises:
- connecting means for connecting to another one of said plurality of terminal apparatuses over the network using the network address of the another one of the plurality of terminal apparatuses.

9. A terminal apparatus, comprising:
- connecting means for connecting to at least one other terminal apparatus over a network whereby content data is shared between said terminal apparatus and the at least one other terminal apparatus;
- reproducing means for reproducing and outputting the shared content data as a browser object;
- enabling means for initiating an application program stored at said terminal apparatus to enable at least one operation to be performed on the browser object by said reproducing means; and
- transmitting and receiving means for transmitting information to and receiving information from the at least one other terminal apparatus over the network, the at least one other terminal apparatus being capable of reproducing and outputting the content data as the browser object and being capable of performing the at least one operation on the browser object, the information including shared information which indicates that the at least one operation was performed on the browser object by at least one of the terminal apparatus and the at least one other terminal apparatus using the application program stored at that terminal apparatus;
- processing means for performing, based on the shared information, the at least one operation on the browser object using the stored application program to obtain a result;
- said reproducing means reproducing and outputting the result of the at least one operation.

10. The terminal apparatus according to claim 9, wherein said enabling means enables a data input operation to be performed on the browser object;
- said transmitting and receiving means transmits the data inputted at said terminal apparatus and receives the data inputted at the at least one other terminal apparatus; and
- said processing sharing means applies the inputted data input or the received data to the browser object.

11. The terminal apparatus according to claim 9, wherein the browser object depicts the content data as a cell for inputting and outputting data or as an operator for executing an operation; and
- said terminal apparatus further comprises:
- controlling means for controlling the stored application program to implement a function when the cell or the operator is operated by said enabling means.

* * * * *

UNITED STATES PATENT AND TRADEMARK OFFICE
CERTIFICATE OF CORRECTION

PATENT NO. : 7,185,056 B2 Page 1 of 1
APPLICATION NO. : 10/328464
DATED : February 27, 2007
INVENTOR(S) : Naoki Fujisawa, Kiyonobu Kojima and Yoshiyuki Takao It is certified that error appears in the above-identified patent and that said Letters Patent is hereby corrected as shown below:

Column 26, line 50, "contents" should read --content--.

Signed and Sealed this

Twenty-fifth Day of March, 2008

JON W. DUDAS
*Director of the United States Patent and Trademark Office*